(12) United States Patent
Singh et al.

(10) Patent No.: US 8,999,037 B2
(45) Date of Patent: Apr. 7, 2015

(54) CARBON MOLECULAR SIEVE MEMBRANE (CMSM) PERFORMANCE TUNING BY DUAL TEMPERATURE SECONDARY OXYGEN DOPING (DTSOD)

(71) Applicant: Georgia Tech Research Corporation, Atlanta, GA (US)

(72) Inventors: Rachana Singh, New Delhi (IN); William John Koros, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 146 days.

(21) Appl. No.: 13/906,143

(22) Filed: May 30, 2013

(65) Prior Publication Data

US 2014/0000454 A1  Jan. 2, 2014

Related U.S. Application Data

(60) Provisional application No. 61/652,944, filed on May 30, 2012, provisional application No. 61/791,512, filed on Mar. 15, 2013.

(51) Int. Cl.
| | | |
|---|---|---|
| *B01D 53/22* | (2006.01) | |
| *C01B 31/02* | (2006.01) | |
| *C01B 13/02* | (2006.01) | |
| *B01D 63/00* | (2006.01) | |
| *B01D 69/08* | (2006.01) | |

(52) U.S. Cl.
CPC .............. *B01D 53/228* (2013.01); *C01B 31/02* (2013.01); *B01D 63/00* (2013.01); *B01D 69/08* (2013.01); *B01D 2256/10* (2013.01); *B01D 2256/12* (2013.01); *B01D 2256/16* (2013.01); *B01D 2256/18* (2013.01); *B01D 2256/22* (2013.01); *B01D 2256/245* (2013.01); *B01D 2257/102* (2013.01); *B01D 2257/104* (2013.01); *B01D 2257/108* (2013.01); *B01D 2257/11* (2013.01); *B01D 2257/504* (2013.01); *B01D 2257/7025* (2013.01); *C01B 13/0266* (2013.01); *Y02C 10/10* (2013.01); *Y02C 20/20* (2013.01)

(58) Field of Classification Search
CPC ........ B01D 63/00; B01D 61/00; B01D 53/22; B01D 53/228; B01D 53/229; B01D 69/00; B01D 69/08; B01D 63/02

USPC .............................................................. 95/50
See application file for complete search history.

(56) References Cited

U.S. PATENT DOCUMENTS

| | | | | |
|---|---|---|---|---|
| 4,873,037 | A  * | 10/1989 | Chau et al. ...................... 264/49 |
| 4,897,092 | A  * | 1/1990  | Burgoyne et al. .................. 95/54 |
| 6,547,859 | B1 * | 4/2003  | Mullhaupt et al. .................. 96/4 |
| 6,565,631 | B2 * | 5/2003  | Koros et al. ......................... 96/8 |
| 6,797,325 | B2 * | 9/2004  | Wang et al. .................... 427/336 |
| 7,138,006 | B2 * | 11/2006 | Miller et al. ...................... 95/45 |
| 7,166,146 | B2 * | 1/2007  | Miller et al. ...................... 95/45 |
| 7,247,191 | B2 * | 7/2007  | Koros et al. ...................... 96/13 |
| 7,563,484 | B2 * | 7/2009  | Wang et al. .................... 427/387 |
| 7,785,397 | B2 * | 8/2010  | Kumar et al. ..................... 95/51 |
| 8,245,978 | B1 * | 8/2012  | Beers et al. ............... 244/135 R |
| 8,366,804 | B2 * | 2/2013  | Liu et al. .......................... 95/45 |
| 8,486,179 | B2 * | 7/2013  | Kiyono et al. .................... 95/51 |
| 8,623,124 | B2 * | 1/2014  | Hosseini et al. .................... 96/4 |
| 8,709,133 | B2 * | 4/2014  | Kiyono et al. .................... 95/51 |
| 2002/0053284 | A1 | 5/2002  | Koros et al. |
| 2003/0162939 | A1 * | 8/2003  | Wang et al. .................... 528/422 |
| 2005/0037149 | A1 * | 2/2005  | Wang et al. ................ 427/430.1 |
| 2005/0284293 | A1 | 12/2005 | Rubas |
| 2007/0017861 | A1 | 1/2007  | Foley et al. |
| 2008/0134883 | A1 * | 6/2008  | Kumar et al. ..................... 95/45 |
| 2011/0100211 | A1 * | 5/2011  | Kiyono et al. .................... 95/45 |
| 2011/0192281 | A1 * | 8/2011  | Hosseini et al. .................. 96/10 |
| 2011/0290112 | A1 * | 12/2011 | Liu et al. .......................... 95/54 |
| 2013/0305921 | A1 * | 11/2013 | Kiyono et al. .................... 95/49 |

OTHER PUBLICATIONS

International Search Report in related Application No. PCT/US2013/043387; mailed Nov. 14, 2013, 3pgs.

* cited by examiner

*Primary Examiner* — Jason M Greene
*Assistant Examiner* — Anthony Shumate
(74) *Attorney, Agent, or Firm* — Troutman Sanders LLP; Ryan A. Schneider; Elizabeth-Ann Weeks

(57) ABSTRACT

The various embodiments of the disclosure relate generally to carbon molecular sieve membranes (CMSM) and their associated fabrication processes, and more particularly to CMSM that maintain high gas selectivities without losing productivity. Methods for enriching a mixture of gases in one gas via the use of the CMS membranes, and gas enrichment devices using the same, are also disclosed.

32 Claims, 16 Drawing Sheets

CARBON MOLECULAR SIEVE MEMBRANE (CMSM) PERFORMANCE TUNING BY DUAL TEMPERATURE SECONDARY OXYGEN DOPING (DTSOD)

CROSS-REFERENCE TO RELATED APPLICATIONS

This application claims the benefit of U.S. Provisional Application Ser. No. 61/652,944, filed on 30 May 2012, entitled "Carbon Molecular Sieve Membrane (CMSM) Performance Tuning By Dual Temperature Secondary Oxygen Doping (DTSOD)" and U.S. Provisional Application Ser. No. 61/791,512, filed on 15 Mar. 2013, entitled "Carbon Molecular Sieve Membrane (CMSM) Performance Tuning By Dual Temperature Secondary Oxygen Doping (DTSOD)", both of which are incorporated herein by reference in their entirety as if fully set forth below.

TECHNICAL FIELD

The various embodiments of the disclosure relate generally to carbon molecular sieve membranes (CMSM) and their associated fabrication processes, and more particularly to CMSM that maintain high gas selectivities without losing productivity.

BACKGROUND OF THE INVENTION

All aircraft potentially have flammable atmospheres in the fuel tanks and in adjacent flammable leakage zones. This is a primary safety issue in aircraft design and operation. In order to avoid flammability, polymeric hollow-fiber membrane gas separation is being used to decrease the oxygen concentration below 12% to create an effectively inert atmosphere. However, the current state-of-the-art polymeric membrane materials are bounded by Robeson's upper bound, which limits the improvements in lowering the membrane surface area and in increasing membrane efficiency. In the last fifteen years, carbon hollow fiber membranes have emerged as materials with performance that exceeds the upper bound of polymeric membrane materials. Early research showed sensitivity to oxygen and water vapor, which would deem the use for air separation impractical. However, more recent research has shown that these issues could be overcome by Teflon@ based coating, oxygen doping, or otherwise modifying the pyrolysis environment.

CMS membranes are generally produced by the pyrolysis of polymer fiber membranes under an inert atmosphere or vacuum. The ultimate properties of CMS membranes are affected by many factors, such as polymer precursor composition, pyrolysis temperature, ramp rate, and thermal soak time at the maximum pyrolysis temperature. The effect of pyrolysis atmosphere has been investigated by several researchers, and it is found that even a trace amount of oxygen in the pyrolysis atmosphere is important in defining transport properties of CMS membranes. This so-called "oxygen doping" has been used during pyrolysis as a tool to fine tune the selective pore windows (ultramicropores) of CMS membranes for natural gas separation, where $O_2$/Argon mixed gas was used in place of a totally inert atmosphere during pyrolysis. A range of oxygen levels varying from 4-50 ppm with the balance comprising argon were used to prepare CMS membranes, and a correlation was found between the amount of oxygen introduced at the temperature of pyrolysis and ultimate separation performance of CMS membranes. The developed method relied on the fact that oxygen molecules chemisorb at ultramicropores, where the open carbon bonds are available at the edges (dangling bonds) and form stable bonds at high temperature. The hypothesis was supported by the experimental results, where the permeability of carbon dioxide decreased with an increase in selectivity up to a point when excessive doping reduced both permeability and selectivity. The applicability of the method was tested for different polymer precursors also. While trace residual elements exist in the carbon molecular sieve materials for pyrolysis temperatures below 1073 K (800° C.), the FTIR spectra are almost featureless in the absence of $O_2$ doping. Even at 10 ppm $O_2$ in the otherwise inert Argon gas used during pyrolysis the FTIR shows some evidence of C=O carbonyl groups. With increasing $O_2$ doping in the Argon, the C=O group absorbance increases without any other apparent groups appearing.

BRIEF SUMMARY

The various embodiments of the disclosure relate generally to carbon molecular sieve membranes and their associated fabrication processes, and more particularly to CMSM that maintain high gas selectivities without losing productivity.

An embodiment of the disclosure can be a process for forming a carbon membrane having the steps of subjecting a polymer precursor membrane to a base pyrolysis temperature (BPT) in a very low oxygen environment (VLOE), subjecting the polymer precursor membrane to a second heat treatment (SHT) step in a higher oxygen environment (HOE), wherein the second temperature can be higher than the BPT. The BPT can be between 400 and 500° C.

In one embodiment, SHT step can be a temperature of greater than or equal to 500° C. In another embodiment, the SHT step can be a temperature of greater than or equal to 525° C. In an alternative embodiment, the SHT step can be a temperature of greater than or equal to 550° C.

In some embodiments, the VLOE can comprise less than 5 ppm oxygen. In other embodiments, the VLOE can comprise about 2 ppm oxygen or less. In an exemplary embodiment, the VLOE can comprise about 1 ppm oxygen or less.

The HOE can comprise at least about 5 ppm oxygen. Alternatively, the HOE can comprise at least about 10 ppm oxygen. In one embodiment, the HOE can comprise between about 5 ppm oxygen and about 60 ppm oxygen. In another embodiment, the HOE can comprise between about 10 ppm oxygen and about 53 ppm oxygen.

The polymer precursor membrane can be a hollow fiber polymer precursor membrane. In an exemplary embodiment, the polymer precursor membrane can be an asymmetric hollow fiber polymer precursor membrane. In an embodiment, the polymer precursor membrane can have a carbon content of at least 60 wt % and a $sp^2$ hybridization of those carbons of at least 70%. In another embodiment, the polymer precursor membrane can have a carbon content of at least 60 wt % and a hydrogen content of less than 5 wt. %.

An embodiment can be a gas separation membrane that can comprise a carbon molecular sieve. The gas separation membrane can have an oxygen/nitrogen selectivity of greater than 7.1, and an oxygen permeance of at least about 13.8.

In an embodiment, gas separation membrane can have an oxygen/nitrogen selectivity of greater than 7.5. Alternatively, in one embodiment, the gas separation membrane can have an oxygen/nitrogen selectivity of greater than 8.

In certain embodiments, the gas separation membrane can have an oxygen permeance of greater than about 25. In other embodiments, the gas separation membrane can have an oxygen permeance of greater than about 30.

The gas separation membrane can have an oxygen/nitrogen selectivity of greater than 7.5 and an oxygen permeance of at least 30. Alternatively, the gas separation membrane can have an oxygen/nitrogen selectivity of at least about 8.7 and an oxygen permeance of at least about 13.8. In an exemplary embodiment, the gas separation membrane can have an oxygen/nitrogen selectivity of at least about 8 and an oxygen permeance of at least about 30.

In some embodiments, the carbon molecular sieve can comprise a pyrolyzed hollow fiber polymer precursor membrane. In exemplary embodiments, the carbon molecular sieve can comprise a pyrolyzed asymmetric hollow fiber polymer precursor membrane.

Another embodiment of the disclosure can be a method of preparing a carbon molecular sieve comprising the steps of pyrolyzing a polymer precursor membrane in a first heat treatment in a very low oxygen environment (VLOE) and subjecting the pyrolyzed polymer precursor membrane in a second heat treatment (SHT) in a higher oxygen environment (HOE), wherein the SHT can occur at a temperature above the first heat treatment.

In one embodiment, the pyrolysis can be conducted at between 400 and 500° C. In another embodiment, the VLOE can comprise less than 5 ppm oxygen. In yet another embodiment, the VLOE can comprise about 2 ppm oxygen or less.

In an embodiment, the HOE can comprise at least about 5 ppm oxygen. In another embodiment, the HOE can comprise at least about 10 ppm oxygen In an exemplary embodiment, the carbon molecular sieve can have an oxygen/nitrogen selectivity of greater than 7.1, and an oxygen permeance of at least about 13.8. In an alternative embodiment, the carbon molecular sieve can have an oxygen/nitrogen selectivity of greater than 8, and an oxygen permeance of at least 13.8.

One embodiment of the disclosure can be a gas enrichment device that can comprise a gas stream inlet, an enriched gas stream outlet, a depleted gas stream outlet, and a plurality of substantially aligned hollow carbon fibers, wherein the hollow carbon fiber can comprise a carbon molecular sieve having a oxygen/nitrogen selectivity of greater than 7.1 and an oxygen permeance of greater than 13.8.

In some embodiments, a hollow fiber carbon molecular sieve can be fed on the bore or lumen passing through the length of the fiber. In other embodiments, the gas stream inlet can be on the outside of the hollow fiber. In either case, a selective layer can exist that can enable separation of gas mixtures in contact with the carbon molecular sieve hollow fiber. In certain embodiments, the membrane can have an oxygen/nitrogen selectivity of greater than 7.5. In exemplary embodiments, the membrane can have an oxygen/nitrogen selectivity of greater than 8.

In an embodiment, the membrane can have an oxygen permeance of greater than 13.8. In alternative embodiments, the membrane can have an oxygen permeance of greater than 30. In an alternative embodiment, the membrane can have an oxygen/nitrogen selectivity of greater than 8 and an oxygen permeance of at least 13.8. In yet another embodiment, the membrane can have an oxygen/nitrogen selectivity of at least about 8.7 and an oxygen permeance of at least about 13.8.

DETAILED DESCRIPTION

Figure 1:
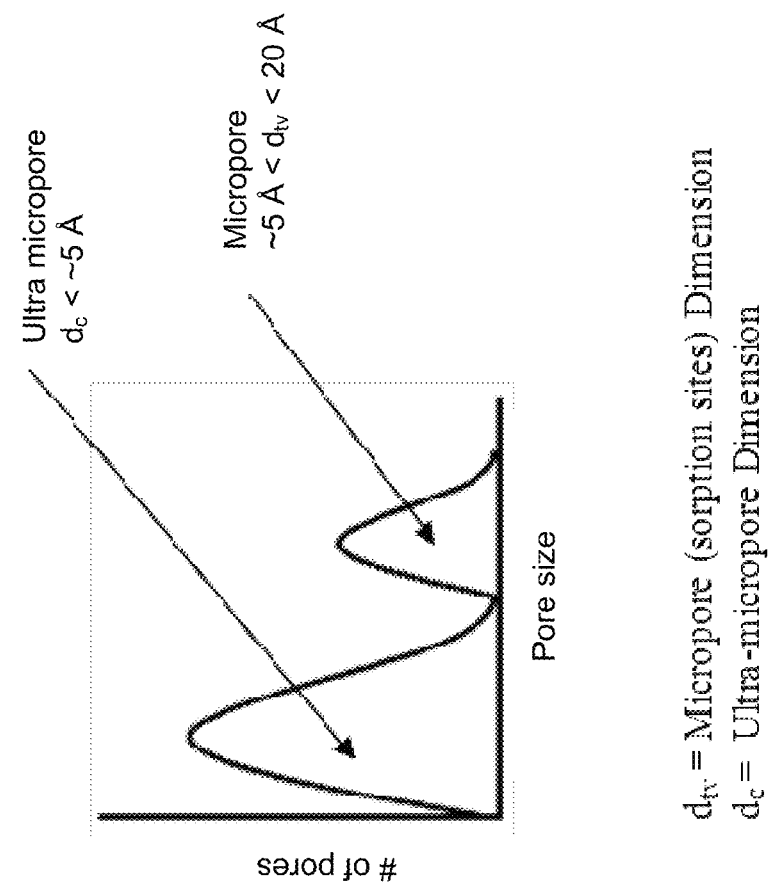
FIG. 1 illustrates (a) structure of carbon material, (b) idealized "slit-like" carbon structure, and (c) bimodal pore size distribution, in accordance with an exemplary embodiment of the disclosure.

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "comprising" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Membranes with high oxygen productivity and $O_2/N_2$ selectivity have been prepared using standard oxygen doping methods known in the art. However, after a limit, oxygen permeance and $O_2/N_2$ selectivity typically dropped with increased oxygen doping, and performance could not be improved further. In an effort to develop better membranes with higher levels of oxygen permeance and gas selectivities, a method has been that is termed herein as "dual temperature secondary oxygen doping" (DTSOD). In this more advanced approach, first more open but less selective membranes can be prepared by pyrolysis at lower temperatures under ultra high purity argon with a negligible oxygen amount, then a secondary temperature treatment step is conducted. In this second step these membranes can be exposed to a certain amount of oxygen for a short period at a higher temperature to produce improved membrane performance. Specifically, higher $O_2/N_2$ selectivity and permeance can be seen, as compared to the same $O_2$ doping gas level at the final temperature. The separation of various gas pairs can be contemplated by the systems and methods of the present disclosure. These gases include, but are not limited to $O_2/N_2$, $He/SF_6$, $CO_2/CH_4$, $C_2H_4/C_2H_6$ and $C_3H_6/C_3H_8$, and the like.

While not wishing to be bound by theory, it is thought that oxygen and nitrogen are both low sorbing gases, and their relative gas sorption (sorption selectivity) can contribute little to the separation. Fine tuning the amount of oxygen and period of exposure at high temperature can allow ultramicropores (the selective sites) to chemisorb oxygen to more precisely approach the molecular dimensions of the diffusing gas molecules, thereby increasing the activation energy or decreasing the allowable entropy to pass through these constrictions. Similar benefits can be envisioned for any gas pair where small size differences may be exploited for separation. It is thought that membranes can effectively sieve nitrogen from oxygen because of restricted molecular rotation in activated regions (ultramicropores). Since the difference in kinetic diameters of the $O_2$ and $N_2$ can be small, precise tuning of the size of the ultramicropores can be required. Standard oxygen doping during pyrolysis can produce membranes with high selectivity, but with low oxygen permeance. On the other hand, the DTSOD as described herein can produce membranes with high oxygen flux and $O_2/N_2$ selectivity substantially above the membranes produced under the standard oxygen doping conditions.

The membranes in these systems can be based on carbon molecular sieve membranes. CMS membranes can be prepared by the pyrolysis of polymer membranes with highly aromatic structures having disordered $sp^2$ hybridized carbon sheets. These CMS membranes have been identified as very promising candidates for gas separation, both in terms of separation properties and stability. The gas separation performance of CMS membranes can depend on the critical pore size and the pore size distribution. It is thought that the pores in CMS are formed by the packing imperfections between ordered regions in the material and can be described as slit-like with an idealized bimodal pore size distribution (FIG. 1). This distribution can consist of large pores of about 5-20 Å, known as micropores or galleries connected by smaller pores of sizes of about less than 5 Å, known as ultramicropores. The larger sized micropores can provide sorption sites, while the ultramicropores can be the sieving sites and the combination of such two types of pores can provide the combined molecular sieving function and high permeability characteristics of these materials.

Figure 2:
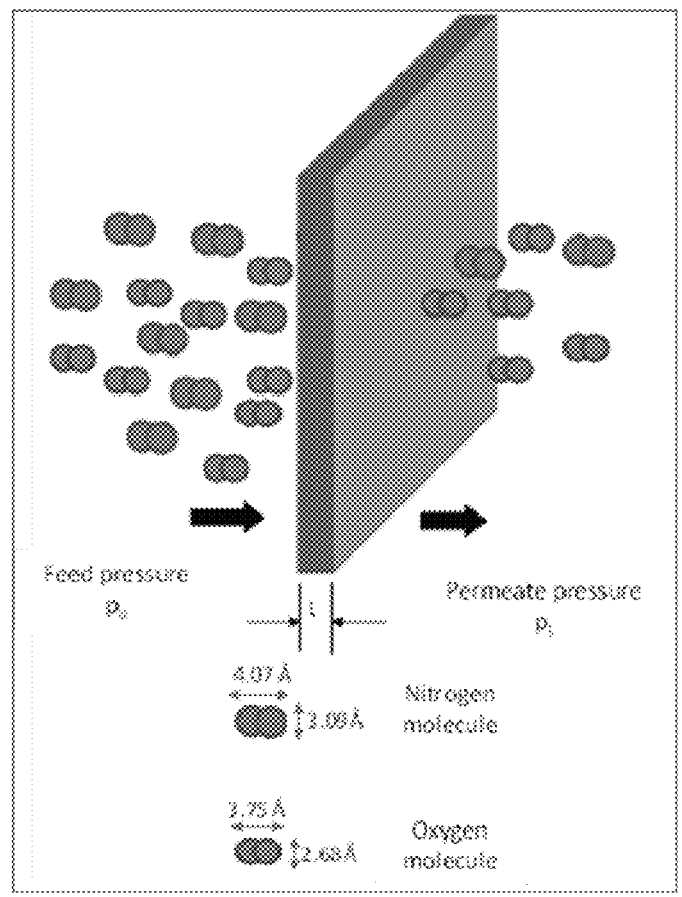
FIG. 2 illustrates gas transport through membrane of thickness l, in accordance with an exemplary embodiment of the disclosure.

Gas transport through carbon molecular sieves is also modeled by a sorption-diffusion mechanism as in polymer membranes (FIG. 2). Gas molecules sorb into the membrane at the upstream side and then diffuse under the influence of chemical potential gradient and finally desorb from the downstream side of the membrane. The intrinsic productivity of CMS fiber membrane is characterized by the permeability ($P_i$), which is the partial pressure difference ($\Delta p_i$) and thickness (l) normalized flux ($n_i$) as shown in Eq. (1):

$$P_i = D_i * S_i = [(n_i * l)/(\Delta p_i)] \qquad (1)$$

The common unit for permeability is the Barrer, where 1 Barrer=$10^{-10}$ [cc(STP) cm]/[cm² sec cmHg]. Also shown in Eq (1) is the common representation of the permeability coefficient as the product of a sorption coefficient ($S_i$) and a diffusion coefficient ($D_i$) to represent the thermodynamic and kinetic contributions, respectively to the permeability. In the case of asymmetric fiber membranes, the actual membrane thickness is not clearly known, so the productivity of these membranes is described by permeance, which is simply the partial pressure normalized flux, shown in Eq (2).

$$[P_i/l] = [n_i/\Delta p_i] \qquad (2)$$

The common units of permeance are gas permeation units (GPU), where 1 GPU=$10^{-6}$ [cc(STP)]/[cm² sec cmHg]. The efficiency of the membrane is reported as the intrinsic selectivity, which is the ratio of permeabilities or permeances of fast gas vs slow gas in eq (3), when the downstream pressure is negligibly small compared to the upstream pressure, viz.

$$\alpha_{ij} = P_i/P_j = [P_i/l]/[P_j/l] \qquad (3)$$

Thus, the embodiments discussed herein capitalize on modifying these membranes to improve both permeance and selectivity. Early efforts using standard pyrolysis in an oxygen atmosphere could achieve either an increase in permeance, or an increase in selectivity, but a trade-off always existed with the other characteristic, e.g. an increase in permeance was coupled with a decrease in selectivity, and vice versa. In order to achieve a step change in permeance and selectivity, the new method of dual temperature secondary oxygen doping was developed. Various embodiments of the disclosure are directed to manufacturing carbon membranes using dual temperature secondary oxygen doping. The carbon membranes can be prepared according to this disclosure. In an embodiment, a polymer precursor membrane can be subjected to a base pyrolysis temperature (BPT) in a very low oxygen environment (VLOE) and then can be subjected to a second heat treatment (SHT) step in a higher oxygen environment (HOE) at a higher temperature than the base pyrolysis temperature.

Not wishing to be bound by theory, it is thought that oxygen molecules can selectively chemisorb at ultramicropores, where the open carbon bonds can be available at the edges and can form stable bonds at high temperature (i.e., during pyrolysis). The "dual temperature secondary oxygen doping" strategy of the present disclosure can first create more open but less selective membranes at lower pyrolysis temperatures under the VLOE. The secondary HOE treatment in which the membranes can be exposed to a certain amount of oxygen for a short period at higher temperatures can produce improved membrane performance. Again, not wishing to be bound by theory, it is thought that fine tuning the amount of oxygen and period of exposure at high temperatures can allow the ultramicropores (i.e., the selective sites) to chemisorb oxygen to more precisely approach the molecular dimension of the diffusing gas molecules.

One particular advantage of the present disclosure is the ability to create highly selective membranes without losing much productivity. The traditional approach of oxygen doping during pyrolysis produces membranes with high selectivities, but with low oxygen permeance. In contrast to the prior art, the methods described herein implement a dual temperature secondary oxygen doping. It has unexpectedly been found that the present disclosure can produce membranes with high oxygen flux and high oxygen/nitrogen selectivities. Thus, a carbon membrane can be formed by subjecting a polymer precursor membrane to a base pyrolysis temperature (BPT) in a very low oxygen environment (VLOE) and then subjecting the polymer precursor membrane to a second heat treatment (SHT) step in a higher oxygen environment (HOE), wherein the SHT step can be higher than the BPT. The BPT can pyrolyze the polymer precursor membrane. The pyrolysis step can be a thermal process in a low or no oxygen environment at a temperature that can transform an original polymer precursor into a primarily carbon structure that can contain greater than 60 wt % carbon.

In one embodiment, the BPT can be between 400° C. and 500° C. In another embodiment, the SHT step can comprise a temperature of greater than or equal to 500° C. In an alternative embodiment, the SHT step can comprise a temperature of greater than or equal to 525° C. In yet another embodiment, the SHT step can comprise a temperature of greater than or equal to 550° C.

In some embodiments, the VLOE can comprise less than 5 ppm oxygen. The VLOE can be 2 ppm or less oxygen, or 1 ppm or less oxygen.

By definition, the VLOE must be lower than the HOE. Thus, in an embodiment, the HOE can comprise at least about 5 ppm oxygen. This can include at least about 6 ppm, at least about 7 ppm, or at least about 8 ppm. In another embodiment, the HOE can comprise at least about 10 ppm oxygen. In an alternative embodiment, the HOE can comprise between about 5 ppm oxygen and about 60 ppm oxygen. In yet another embodiment, the HOE can comprise between about 10 ppm oxygen and about 53 ppm oxygen.

The polymer precursor membrane in the pyrolysis can be a hollow fiber polymer precursor membrane. Alternatively, the polymer precursor membrane can be an asymmetric hollow fiber polymer precursor membrane. In an embodiment, the polymer materials used to prepare these polymer precursor membranes can preferably be high in carbon content relative to other elements in order to produce the polymer precursor membranes used in the pyrolysis step, which carbonizes the original polymer precursor. Thus, polymer materials are compounds having a high degree of $sp^2$ hybridization and lower hydrogen content. Thus, in an embodiment, polymer precursor membrane can have a carbon content of at least 60 wt % carbon and a hydrogen content of less than 5 wt % hydrogen. The carbon content can be at least about 65 wt %, or at least about 70 wt %. In some embodiments, the polymer precursor membrane can have a carbon content of at least 60 wt % carbon in which at least about 70% of those carbons are $sp^2$ or higher hybridization, e.g. less than 30% of those carbons are $sp^3$ hybridized.

According to the present disclosure, a gas separation membrane can be manufactured that can comprise a carbon molecular sieve. The carbon molecular sieve can comprise a pyrolyzed hollow fiber polymer precursor membrane. Alternatively, the carbon molecular sieve can comprise a pyrolyzed asymmetric hollow fiber membrane. The membrane can have an oxygen/nitrogen selectivity of greater than 7.1 and can have an oxygen permeance of at least about 13.8. In some embodiments, the gas separation membrane can have an oxygen/nitrogen selectivity of greater than 7.5. In other embodiments, the oxygen/nitrogen selectivity can be greater than 8. In alternative embodiments, the oxygen permeance can be greater than about 25. In yet another embodiment, the oxygen permeance can be greater than about 30. In one embodiment, the separation membrane can have an oxygen/nitrogen selectivity of greater than 7.5 and an oxygen permeance of at least 30. In another embodiment, the oxygen/nitrogen selectivity can be at least about 8.7 and the oxygen permeance can be at least about 13.8. Alternatively, the oxygen/nitrogen selectivity can be at least about 8 and the oxygen permeance can be at least about 30.

In some embodiments, the carbon molecular sieve can comprise a pyrolyzed hollow fiber polymer precursor membrane. In exemplary embodiments, the carbon molecular sieve can comprise a pyrolyzed asymmetric hollow fiber polymer precursor membrane.

Another embodiment of the disclosure can be a method of preparing a carbon molecular sieve comprising the steps of pyrolyzing a polymer precursor membrane in a first heat treatment in a very low oxygen environment (VLOE) and subjecting the pyrolyzed polymer precursor membrane in a second heat treatment (SHT) in a higher oxygen environment (HOE), wherein the SHT can occur at a temperature above the first heat treatment.

In one embodiment, the pyrolysis can be conducted at between 400 and 500° C. In one embodiment, the VLOE can comprise less than 5 ppm oxygen. In another embodiment, the VLOE can comprise about 2 ppm or less oxygen, or about 1 ppm or less oxygen.

In an embodiment, the HOE can comprise at least about 5 ppm oxygen. In another embodiment, the HOE can comprise at least about 10 ppm oxygen In an exemplary embodiment, the carbon molecular sieve prepared according to the method can have an oxygen/nitrogen selectivity of greater than 7.1, and an oxygen permeance of at least about 13.8. In some embodiments, the gas separation membrane can have an oxygen/nitrogen selectivity of greater than 7.5. In other embodiments, the oxygen/nitrogen selectivity can be greater than 8. In alternative embodiments, the oxygen permeance can be greater than about 25. In yet another embodiment, the oxygen permeance can be greater than about 30. In one embodiment, the separation membrane can have an oxygen/nitrogen selectivity of greater than 7.5 and an oxygen permeance of at least 30. In another embodiment, the oxygen/nitrogen selectivity can be at least about 8.7 and the oxygen permeance can be at least about 13.8. Alternatively, the oxygen/nitrogen selectivity can be at least about 8 and the oxygen permeance can be at least about 30.

The membranes disclosed herein are described based on their capacity to separate oxygen and nitrogen. However, while assessment of the membranes is described by that capacity, the use of the membranes is not so limited. The separation of other gases can be contemplated by the present disclosure. Those gas pairs include, but are not limited oxygen/nitrogen, helium/sulfur hexafluoride, carbon dioxide/methane, ethylene/ethane, propylene/propane, and the like.

One embodiment of the disclosure can be a gas enrichment device comprising a gas stream inlet, an enriched gas stream outlet, a depleted gas stream outlet, and a plurality of substantially aligned hollow carbon fibers, wherein the hollow carbon fiber can comprise a carbon molecular sieve having a oxygen/nitrogen selectivity and an oxygen permeance as defined above. The hollow fiber carbon molecular sieve can include a bore or lumen passing through the length of the fiber, and a membrane surrounding the bore or lumen as part of the outside of the fiber. In some embodiments, the gas stream inlet can be on the bore-side of the hollow fiber. In an alternative embodiment, the gas stream inlet can be on the membrane-side of the hollow fiber.

As described above, the membrane can have an oxygen/nitrogen selectivity of greater than 7.1, and an oxygen permeance of at least about 13.8. The oxygen/nitrogen selectivity of greater than 7.5. In exemplary embodiments, the membrane can have an oxygen/nitrogen selectivity of greater than 8. In an embodiment, the membrane can have an oxygen permeance of greater than 13.8. In alternative embodiments, the membrane can have an oxygen permeance of greater than 30. In an alternative embodiment, the membrane can have an oxygen/nitrogen selectivity of greater than 8 and an oxygen permeance of at least 13.8. In yet another embodiment, the membrane can have an oxygen/nitrogen selectivity of at least about 8.7 and an oxygen permeance of at least about 13.8.

Another embodiment of the disclosure includes a method of purifying a gas stream, or a method of decreasing or increasing the content of a gas in a mixture of gases. The gas stream can include at least a first gas and a second gas. The method includes contacting the gas stream, i.e. the mixed gas stream or mixture of gases, with a gas separation membrane as embodied in the disclosure herein, and separating two gas streams at the membrane. The first gas stream can be an enriched first gas and a depleted second gas. The second gas stream can be enriched in the second gas and depleted in the first gas. In some embodiments, the enriched gas stream can be a mixture. However, the enriched gas stream can also include predominantly or almost exclusively one gas, when the selectivity between the two gas streams is very high (e.g. helium/$SF_6$.)

In an embodiment, the gas stream can be any mixture of gases that one of ordinary skill in the art might wish to separate. The gas stream can including a mixture containing oxygen and nitrogen, a mixture containing carbon dioxide and methane, a mixture containing helium and nitrogen, or a mixture containing helium and sulfur hexafluoride. The mixture can be an atmospheric mixture, including air. In some embodiments, the gas mixture can be selected from a group consisting of oxygen/nitrogen, helium/sulfur hexafluoride, carbon dioxide/methane, ethylene/ethane, and propylene/propane. In other embodiments, the gas mixture can be oxygen and nitrogen.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

EXAMPLES

Example 1

Materials and Preparation of Hollow Fiber Polymer Precursor Membranes

Figure 3:
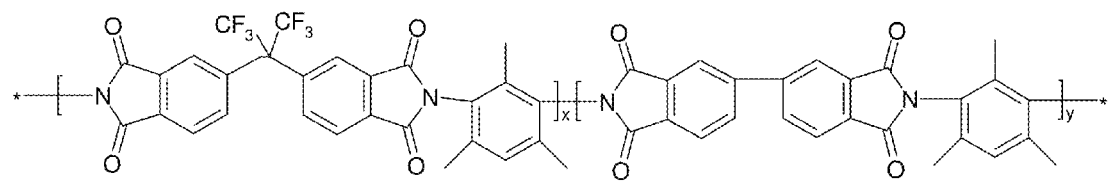
FIG. 3 illustrates the structure of 6FDA/BPDA-DAM (x:y=1:1), in accordance with an exemplary embodiment of the disclosure.
Figure 4:
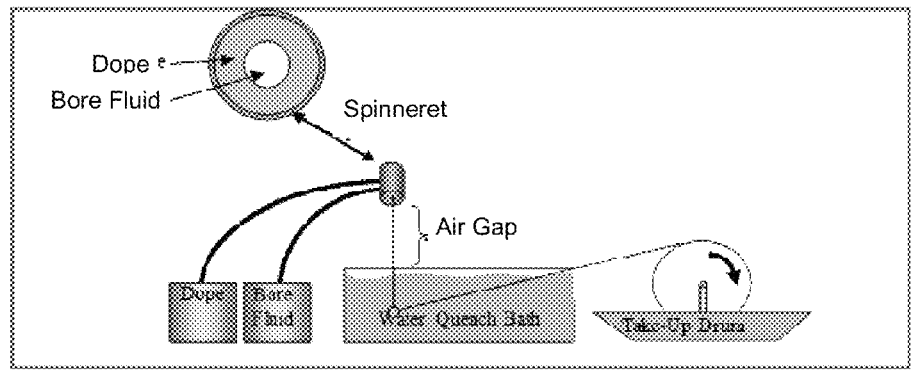
FIG. 4 illustrates optimized spinning conditions for a defect-free asymmetric hollow fiber membrane, in accordance with an exemplary embodiment of the disclosure.

A polyimide precursor, 6FDA/BPDA-DAM (1:1) (FIG. 3), was used in this work to prepare asymmetric hollow fiber membranes by a dry-jet/wet-quench spinning process (FIG. 4). 6FDA/BPDA-DAM, polymer was first dried in a vacuum oven at 110° C. overnight to remove moisture. The 6FDA/BPDA-DAM precursor material discussed herein is completely amorphous based on extensive prior characterization. A spinning dope was then prepared with a composition of 20 wt % 6FDA/BPDA-DAM, 47.5 wt % 1-Methyl-2-pyrrolidinone (NMP, Sigma-Aldrich Inc., 99.5%), 16 wt % Ethanol (Sigma-Aldrich Inc., ≥99.5%), 10 wt % Tetrahydrofuran (THF, Sigma-Aldrich Inc., 99.5%), and 6.5% $LiNO_3$ (Sigma-Aldrich Inc., 99.5%) in a Qorpak® glass jar sealed with a Teflon® cap. The mixture was dissolved by placing the jar on a roller first under heat followed by rolling at room temperature to produce a homogeneous spin dope (usually one week). The prepared dope was then loaded into a 500-mL syringe pump (ISCO Inc., Lincoln, Nebr.) and allowed to degas overnight at 50° C. Bore fluid (90 wt %:10 wt %; NMP:$H_2O$) was loaded into a separate 100-mL syringe pump. The dope and bore fluid were co-extruded through a custom spinneret with in-line filtration between the delivery pumps and the spinneret with 20µ and 2µ metal filters, respectively. Spinning was temperature-controlled, with thermocouples placed on the spinneret, dope line and dope pump. The co-extruded dope solution with bore fluid passed through an air gap and was immersed into a water quench bath. The phase-separated hollow fiber spin line was then collected on a 0.32 m diameter rotating polyethylene drum after passing over a Teflon® guide. After cutting the fibers off of the take-up drum, the fibers were immersed into water baths for solvent exchange for 48 hours with occasional exchange of water. The fibers were solvent exchanged in glass containers with three separate 20 min methanol (VWR International LLC., ACS grade) baths followed by 3 separate 20 min hexane (VWR International LLC., ACS grade) baths and dried under vacuum at 120° C. for 2 h. Take-up rate, air gap, spinning temperature, water quench bath temperature, etc. were adjusted to obtain 6FDA/BPDA-DAM polymer fibers with desired properties (table 1).

TABLE 1

Optimized spinning conditions for defect-free asymmetric hollow fiber membrane.

| Polymer | 6FDA/BPDA-DAM |
|---|---|
| Dope flow rate (mL/hr) | 180 |
| Bore flow rate (mL/hr) | 60 |
| Air-gap height (cm) | 5 |
| Take-up rate (m/min) | 15 |
| Quench bath (water) temperature (° C.) | 40 |
| Fiber O.D. (microns) | 300 |

Preparation of CMS Membranes.

Figure 5:
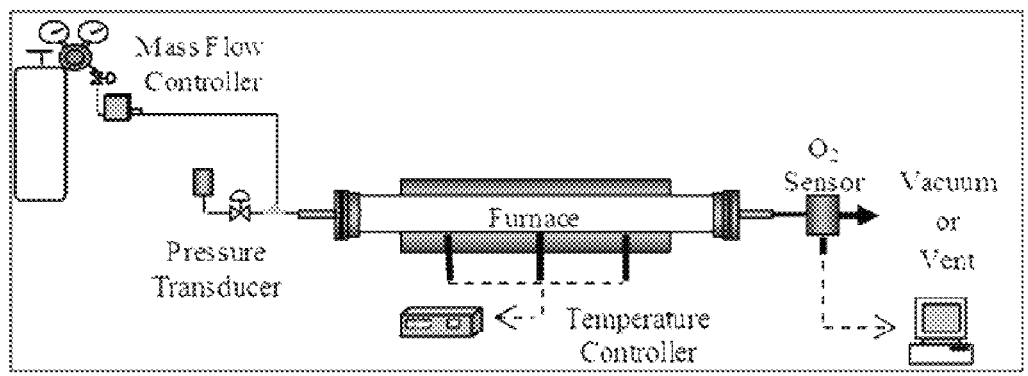
FIG. 5 illustrates pyrolysis setup for pyrolysis of polymer film membranes, in accordance with an exemplary embodiment of the disclosure.

The polymer fiber membranes were placed on a stainless steel wire mesh plate (McMaster Carr, Robbinsville, N.J.) and loosely bound separately with thin stainless steel wires, and loaded into a pyrolysis setup. The pictorial diagram of the pyrolysis setup is given in FIG. 5, consisting of a three-zone furnace (Thermocraft, Inc., model # XST-3-0-24-3C, Winston-Salem, N.C.) connected to a multichannel temperature controller (Omega Engineering, Inc., Stamford, Conn.), and a quartz tube (National Scientific Co., 55 mm ID and 4 ft long, Quakertown, Pa.) is used to load the fibers. An assembly of a metal flange with silicon O-rings (MTI Corporation, model EQ-FI-60, Richmond, Calif.) was used on both ends of a quartz tube. An oxygen analyzer (Cambridge Sensotec Ltd., Rapidox 2100 series, Cambridge, England with ±1% accuracy between 10-20 ppm and 100%) was integrated to monitor oxygen concentration during the pyrolysis process. Flow rate of the purging gas was controlled with a mass flow controller (Alicat Scientific, part number MC-500SCCM-D) and confirmed with a bubble flow meter before and after each experiment. Between experiments, the quartz tube and wire mesh were rinsed with acetone (Aldrich) and baked in air at 800° C. to remove any residue which could affect subsequent runs.

A detailed study was performed to establish the dual temperature secondary oxygen doping method as a property tuning tool using the following experiments to define the effects of processing on separation performance:
 a) pyrolysis at 500° C. with a 2 hour soak time using a mixed gas containing specific amounts of oxygen (1, 10, 32, and 53 ppm) with the balance being argon (Table 2a).
 b) pyrolysis under ultra high purity (UHP) argon at 550° C. with a 2 hour soak time (Table 2b).
 c) pyrolysis under ultra high purity (UHP) argon at 500° C. with a 2 hour soak time, followed by cooling to 50° C., and finally by a rapid ramp to 550° C. with a 10 minute soak at to 550° C. (Table 2c) with no change in purge gas
 d) In separate experiments, polymer fiber membranes were pyrolyzed under UHP argon at 500° C. with a 2 hour soak time, followed by cooling to 50° C. Then, a secondary treatment (Table 2d) was performed by rapidly increasing temperature to 550° C. with a soak for 10 minute using a mixed gas purge containing specific amounts of oxygen (10, 27 and 53 ppm), with the balance being argon.

TABLE 2a

Temperature protocol for pyrolysis of 6FDA/BPDA-DAM polymer membranes at 500° C.

| | $T_{initial}$ (° C.) | $T_{final}$ (° C.) | Ramp Rate (° C./min) |
|---|---|---|---|
| Pyrolysis | 50 | 250 | 13.3 |
| | 250 | 485 | 3.85 |
| | 485 | 500 | 0.25 |
| | 500 | 500 | 2 hour soak |

TABLE 2b

Temperature protocol for pyrolysis of 6FDA/BPDA-DAM polymer membranes at 550° C.

| | $T_{initial}$ (° C.) | $T_{final}$ (° C.) | Ramp Rate (° C./min) |
|---|---|---|---|
| Pyrolysis | 50 | 250 | 13.3 |
| | 250 | 535 | 3.85 |
| | 535 | 550 | 0.25 |
| | 550 | 550 | 2 hour soak |

TABLE 2c

Temperature protocol for pyrolysis of 6FDA/BPDA-DAM polymer membranes at 500° C. with a secondary temperature treatment at 550° C. under UHP argon.

| | $T_{initial}$ (° C.) | $T_{final}$ (° C.) | Ramp Rate (° C./min) |
|---|---|---|---|
| Pyrolysis | 50 | 250 | 13.3 |
| | 250 | 485 | 3.85 |
| | 485 | 500 | 0.25 |
| | 500 | 500 | 2 hour soak |
| Secondary temperature treatment | 50 | 550 | 10 |
| | 550 | 550 | 10 min soak |

TABLE 2d

Temperature protocol for pyrolysis of 6FDA/BPDA-DAM polymer membranes at 500° C. with a secondary temperature treatment at 550° C. under a mixed gas purge containing specific amounts of oxygen (10, 27 and 53 ppm), with the balance being argon.

| | $T_{initial}$ (° C.) | $T_{final}$ (° C.) | Ramp Rate (° C./min) |
|---|---|---|---|
| Pyrolysis | 50 | 250 | 13.3 |
| | 250 | 485 | 3.85 |
| | 485 | 500 | 0.25 |
| | 500 | 500 | 2 hour soak |
| Secondary oxidative temperature treatment | 50 | 550 | 10 |
| | 550 | 550 | 10 min soak |

Hollow Fiber Gas Permeation.

To test the CMS fibers for pure gas permeation, small lab-scale single fiber modules were prepared and loaded in a constant volume-variable pressure permeation system. Both the upstream and downstream of the permeation system were evacuated under vacuum for at least 12 h and a leak rate was measured, which was always less than 1% of the permeate rate of the slowest gas. Tests were performed at 35° C. Once the whole system was evacuated, the upstream was pressurized with the test gas while the downstream was maintained at vacuum, but isolated from the vacuum pump. The pressure rise in a standard volume on the downstream was monitored over time by LabView (National Instruments, Austin, Tex.) and the permeance was calculated using the equation above. The system was evacuated for at least 12 h before experiments with different gases.

Results of Oxygen Doping During Pyrolysis.

Figure 6:
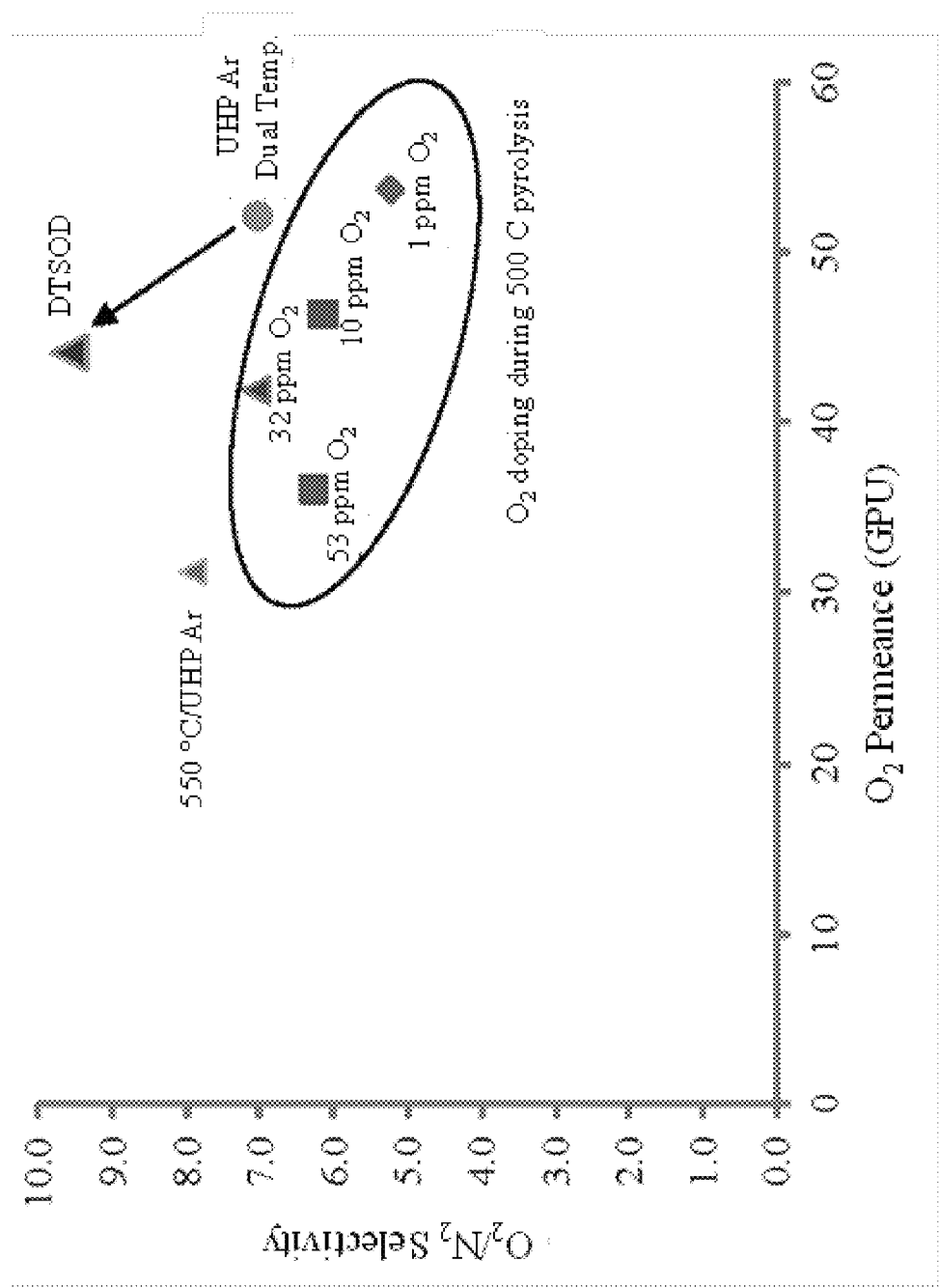
FIG. 6 illustrates a plot of permeation results of CMS fiber membranes prepared by pyrolysis at 500° C. under different $O_2$/Ar atmospheres and at 550° C. under UHP argon, in accordance with an exemplary embodiment of the disclosure.

CMS membranes, prepared by pyrolysis at 500° C. under 1, 10, 32, and 53 ppm $O_2$/argon atmospheres (table 2), were tested for their permeation properties for comparison (FIG. 6). With increasing oxygen amount in pyrolysis atmosphere (up to 32 ppm), there was a clear increase in selectivity for $O_2/N_2$ with a loss in oxygen permeance as was observed in the case of natural gas separation. However, a higher doping amount of oxygen (53 ppm) during pyrolysis produced membranes with lower gas flux and selectivity due to "over doping" of ultramicropores and blocking effective diffusion of both oxygen and nitrogen gas molecules. This response was also seen in natural gas separations where doping above 32 ppm resulted in a drop of both $CO_2/CH_4$ selectivity and $CO_2$ permeance.

Results of Dual Temperature Pyrolysis.

The oxygen doping during pyrolysis failed to produce highly selective membranes with sufficiently high oxygen productivities. The highest oxygen selectivity obtained was 7.1 for the $O_2/N_2$ gas pair with ~41 GPU oxygen permeance under 32 ppm $O_2$/Ar atmosphere. Pyrolysis at 550° C. with a two hour soak (table 2b) under UHP argon caused membranes to collapse more compared to lower temperature pyrolysis and produced membranes with comparatively higher selectivity ($\alpha_{O2/N2}$=7.9), but lower oxygen permeance (31 GPU) (FIG. 6).

An experiment was performed to study the effect of a dual temperature program on CMS membrane performance, which can take advantage of an open structure formation from lower pyrolysis temperature and higher selectivity on secondary temperature treatment. Polymer membranes were pyrolyzed under UHP argon at 500° C. with a two hour soak, followed by exposure to 550° C. for 10 minutes (table 2c). The selectivity obtained was similar to the membranes prepared with 32 ppm $O_2$/Ar doping, but with improved oxygen productivity (52 GPU) (FIG. 6). These results suggested the use of oxygen doping during short secondary temperature treatment to tune the ultramicropores to achieve higher selectivities while maintaining the high oxygen flux.

Results of Dual Temperature Secondary Oxygen Doping (DTSOD).

Figure 7:
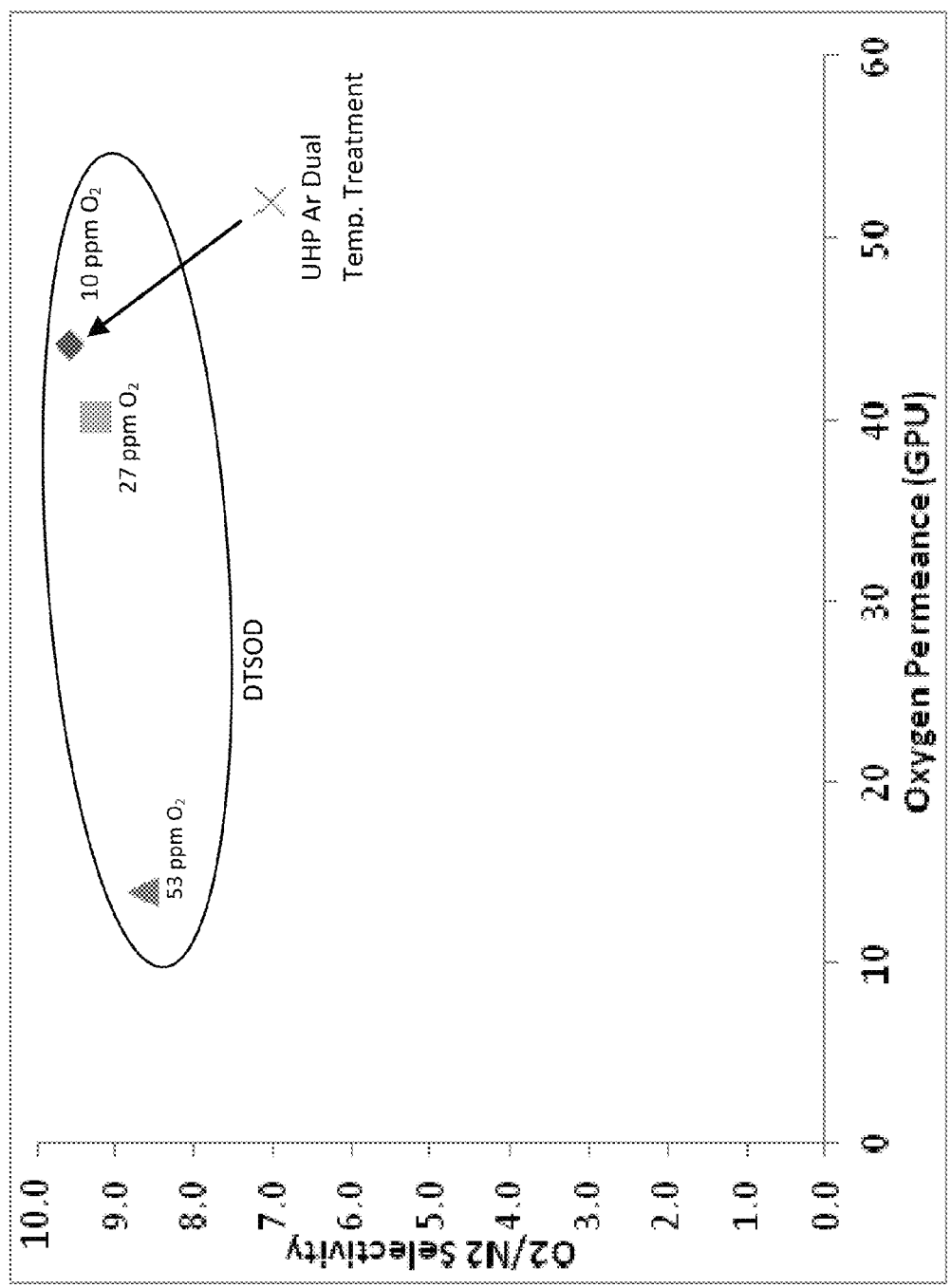
FIG. 7 illustrates a plot of permeation results of CMS fiber membranes prepared by dual temperature secondary oxygen doping method with different oxygen doping amounts, in accordance with an exemplary embodiment of the disclosure.

To improve selectivity while maintaining the high oxygen permeance, membranes were prepared by the DTSOD method and the resulting membranes showed more attractive selectivities than oxygen doping during pyrolysis experiments. Performance of the DTSOD membranes ranged from $\alpha_{(O2/N2)}$=8.7 to 9.6 and oxygen permeances from 13.8 to 44 GPU; depending on the oxygen amount used during secondary step (FIGS. 6 & 7). Pyrolysis was performed at 500° C. with a two hour soak (table 2d). Pyrolysis at lower temperatures led to decreased collapse of the membrane substructure, and as a result a more open support layer was formed. Thus, an effective doping can be used to prepare CMS membranes with higher productivity and selectivity. Doping with 53 ppm, 27 ppm and 10 ppm $O_2$ with balanced argon was performed in the secondary temperature treatment. A 10 ppm $O_2$ doping at 550° C. for 10 minutes produced membranes with the highest selectivity while maintaining high membrane productivity. Considering the data in FIG. 6, 1 ppm oxygen doping showed lower selectivity than 10 ppm with a clear trend following the same pattern expected with DTSOD method, so we have not pursued this point; however, some refinement of the performance in FIG. 6 for the DTSOD method may be possible for lower $O_2$ ppm cases. On increasing the oxygen amount beyond 10 ppm O2, (e.g., 27 ppm and 53 ppm $O_2$), a reduction in both oxygen permeance and $O_2/N_2$ selectivity was observed due to over doping of ultra-micropores. The effect of oxygen doping can also be compared with the membranes prepared by dual temperature treatment under UHP argon (table 2c). Selectivity was significantly improved for the DTSOD samples with little loss in productivity (FIG. 7), so oxygen doping has been proved again as an effective tool for tuning of CMS membrane performance.

Hypothesis Regarding Performance Improvement During DTSOD.

The decomposition of polymer during pyrolysis involves three major steps: (1) precarbonation, (2) carbonation, and (3) dehydrogenation. In precarbonation, below the decomposition temperature, excess solvents and monomers are removed and no oxygen is consumed. During the carbonation step, at decomposition temperature or higher, the polymer decomposes and converts to carbon, most of the oxygen available is consumed by by-products. Once most of the by-products are evolved, the dehydrogenation step begins, and the consumption of oxygen by the by-products decreases significantly and larger amounts of oxygen are available for CMS membrane formation compared to precarbonation and carbonation steps. As reported earlier, the oxidation of by-products is kinetically controlled, while the oxidation of the active carbon edges for doping is equilibrium controlled and therefore the affinity of oxygen molecules to adsorb on surface and penetrate through CMS membranes to react with active carbon edges, depends on oxygen concentration in the external bulk phase and also on the temperature which is related to the energetics of chemisorption. Another phenomenon taking place during preparation of CMS membranes is the densification of the nanoscale selective layer, which may also contribute to the selectivity improvement but simultaneously reduces the overall gas permeance.

Figure 8:
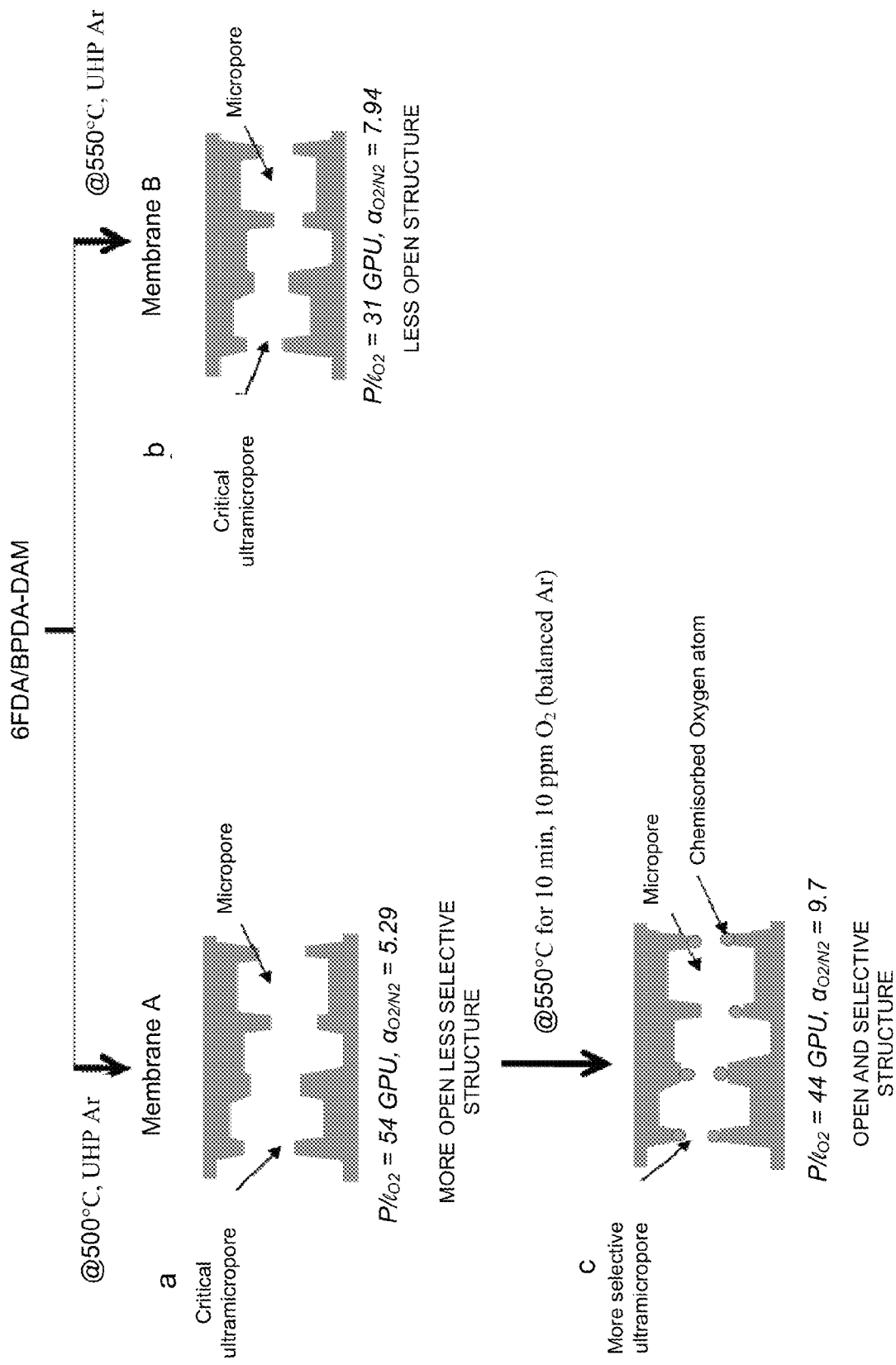
FIG. 8 illustrates the formation of (a) more open and less selective pores on pyrolysis at lower temperature, (b) more selective but less open pores on pyrolysis at higher temperature, (c) more selective but more open pore structures formed by dual temperature secondary oxygen doping, in accordance with an exemplary embodiment of the disclosure.

The lower pyrolysis temperature (500° C.) under low oxygen concentration produces CMS membranes with more open structures (more open micropores) and less selective ultramicropores compared to less open and more selective membranes pyrolyzed at a higher temperature (550° C.) (FIG. 8, diagrams a & b, respectively) due to decreased densification of the fiber selective layer. The secondary heat treatment of the CMS membranes prepared at the lower pyrolysis temperature with exposure to trace oxygen amount (with balanced argon) at 550° C. produces membranes with very high selectivities and lower loss in oxygen permeance (FIG. 8, diagram c). Oxygen molecules are believed to selectively chemisorb on the more active ultra-micropores at high temperatures, making them more selective, while the open micropores contribute higher productivities.

Membranes pyrolyzed at 500° C. showed extremely high oxygen permeance (~54 GPU). The selectivity ($\alpha_{O2/N2}$=5.3), however, was not very attractive and didn't increase much compared to the polymer precursor membrane ($\alpha_{O2/N2}$=3.4). The high permeance indicates a more open molecular matrix in the partially pyrolyzed material. Pyrolysis at 550° C. subjected the membranes not only to a higher temperature but also longer pyrolysis times. The total cycle time for 550° C. pyrolysis was 50 minutes longer compared to the 500° C. pyrolysis. CMS membranes prepared by pyrolysis at 550° C. with a 2 hour soak time showed a reduction in oxygen permeance (31 GPU) accompanied with an increase in selectivity ($\alpha_{O2/N2}$=7.9). This suggests that a molecular matrix was formed at higher temperature with greater size and shape selectivity or mobility selectivity than 500° C. pyrolyzed membranes. An open structure of the membranes was still present upon a rapid increase of temperature from 500 to 550° C. during pyrolysis under UHP argon showing 52 GPU oxygen permeance and $\alpha_{(O2/N2)}$=7.1; however, the $O_2/N_2$ selectivity in FIG. 6 and oxygen permeance were still lower than for the simple UHP argon 550° C. sample.

Oxygen doping in a secondary temperature step at 550° C. with a 10 minute soak time was then pursued to prepare membranes with still higher selectivities (FIGS. 6, 7 & 8, diagram c). The temperature was rapidly increased to 550° C. and with a short 10 minute soak to reduce the collapse. Introduction of 10 ppm $O_2$/Ar or 27 ppm $O_2$/Ar in the secondary heat treatment step improved the selectivity significantly. However, 53 ppm $O_2$/Ar was found again to be an over-doping amount in the secondary step, yielding membranes with very low oxygen flux and selectivity. The 10 ppm $O_2$/Ar at 550° C. for 10 minutes was found to be the optimum atmosphere for this performance tuning step where the oxygen molecules are effectively doped on the ultramicropores while maintaining the open galleries (micropores), thereby resulting in very high selectivity with high oxygen permeance. Past studies have clearly shown the generality of the oxygen doping method with different types of polymer precursors beyond the 6FDA/BPDA-DAM material considered here. It seems very likely that the DTSOD method, like $O_2$ doping itself, will be easily applied to many other polymer precursors as well.

Tuning the performance of CMS membrane for natural gas separations by oxygen doping has been reported previously. Here, however, for $O_2/N_2$ separation, the DTSOD resulted in preparation of more attractive CMS membranes. A study of the effects of oxygen doping during pyrolysis for $O_2/N_2$ separation was also performed for better comparison. Doping with 53 ppm $O_2$/Ar seemed to over-saturate the ultra-micropores in both the cases and a reduction in both $O_2/N_2$ selectivity and oxygen permeance was observed. Secondary temperature treatment at 550° C. for 10 minutes under 10 ppm $O_2$/Ar atmosphere produced the best membranes with highest $O_2/N_2$ selectivity while maintaining high oxygen permeances. Sorption experiments are underway to fully understand the change in the micropore and ultra-micropore size distribution upon introducing secondary oxidative temperature treatment and will be reported subsequently.

Example 2

Figure 9:
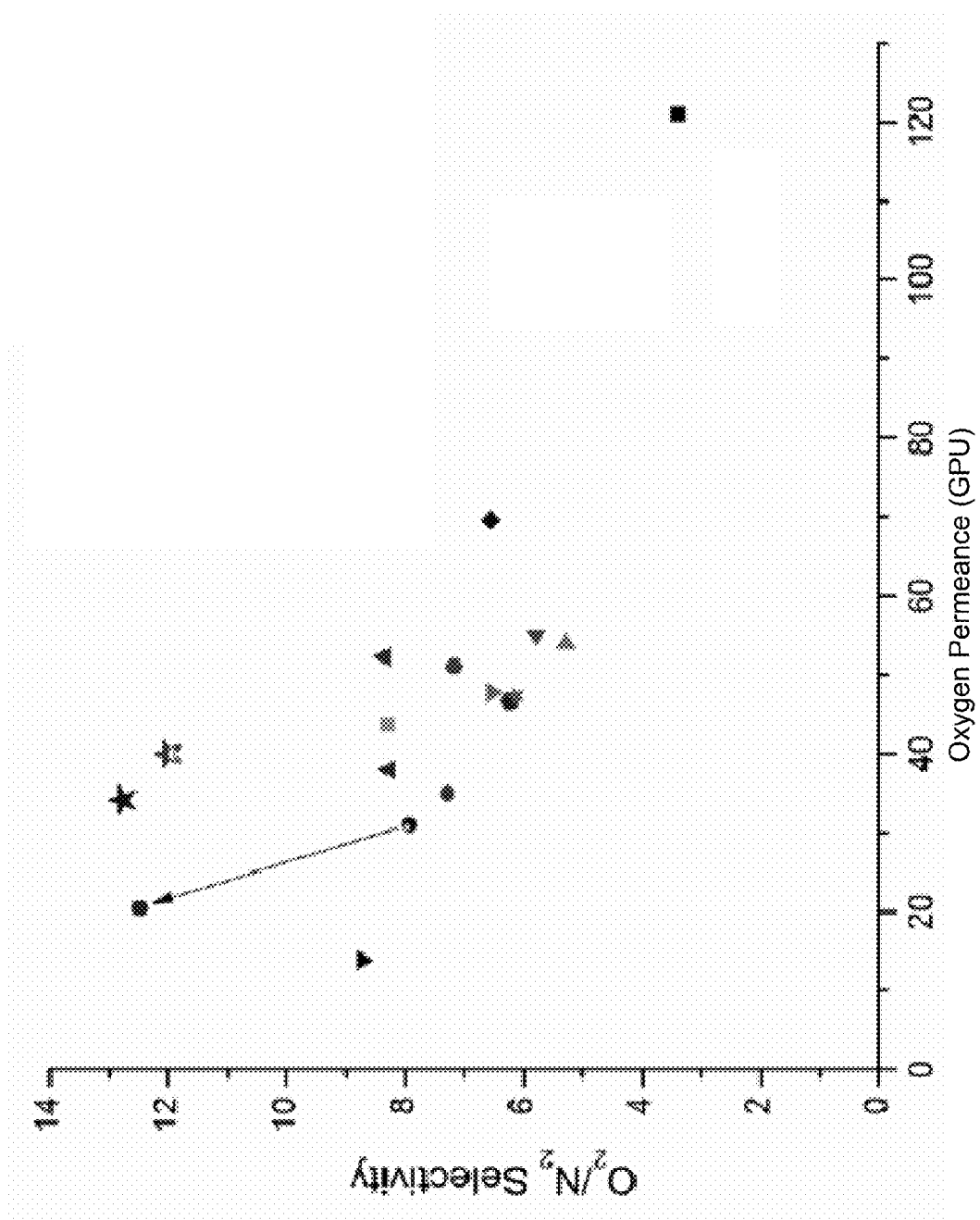
FIG. 9 illustrates the performance of CMS membranes at 35° C. and ~60 psia feed pressure, in accordance with an exemplary embodiment of the disclosure.

A series of samples were also tested to develop and explore the range of conditions for the process. The procedure for in-situ pyrolysis and heat post treatment involves pyrolysis of polymer membranes under low oxygen atmosphere (either UHP argon or 1 ppm oxygen with balanced argon cylinders) to get the highly permeable CMS membranes with moderate selectivity. These CMS membranes are again heated to a selected high temperature (mainly 550° C.) and exposed to higher oxygen amount (10 or 24 ppm) than used during pyrolysis. This results in a great improvement of selectivity with a little compromise with permeance (table 5 & FIG. 9).

TABLE 5

Carbon Membrane for $O_2/N_2$

| | 6FDA-BPDA-DAM STATE | Pyrolysis Atmosphere | Pyrolysis Temperature (°C.) | Soak Time (min) | Atmosphere for Heat Post Treatment | Temperature for HPT (°C.) | Soak Time (min) |
|---|---|---|---|---|---|---|---|
| 1 | ST7-POLYMER | — | — | — | — | — | — |
| 2 | RS_6F_Sp2_ST7_06162011_550_UHP Ar | UHP Ar | 550 | 120 | — | — | — |
| 3 | RS_6F_Sp2_ST8_06212011_550_UHP Ar | UHP Ar | 550 | 120 | — | — | — |
| 4 | RS_6F_Sp2_ST7_06263011_500_4h | UHP Ar | 500 | 240 | — | — | — |
| 5 | RS_6F_Sp2_ST7_06302011_500_Hramp | UHP Ar | 500 | 120 | — | — | — |
| 6 | RS_6F_Sp2_ST7_07082011_500_1ppm | 1 ppm O2 + Ar | 500 | 120 | — | — | — |
| 7 | RS_6F_Sp2_ST7_07082011_500_1ppm_Heat PT_08092011_550 | — | — | — | 53 ppm O2 + Ar | 550 | 30 |
| 8 | RS_6F_Sp2_ST7_07112011_500_Hramp_1ppm | 1 ppm O2 + Ar | 500 | 120 | — | — | — |
| 9 | RS_6F_Sp2_ST7_07132011_500_10ppm_mod2 | 10 ppm O2 + Ar | 500 | 120 | — | — | — |
| 10 | RS_6F_Sp2_ST7_07192011_500_32ppm | 32 ppm O2 + Ar | 500 | 120 | — | — | — |
| 11 | RS_6F_Sp2_ST7_07272011_500_53ppm | 53 ppm O2 + Ar | 500 | 120 | — | — | — |
| 12 | RS_6F_Sp2_ST7_07272011_500_53ppm_08272011_HPT_53ppm | — | — | — | 53 ppm O2 + Ar | 550 | 30 |
| 13 | RS_6F_Sp2_ST7_08042011_525_53ppm | 53 ppm O2 + Ar | 525 | 120 | — | — | — |
| 14 | RS_6F_Sp2_ST7_08042011_525_53ppm_Heat PT_08092011_53ppm | — | — | — | 53 ppm O2 + Ar | 550 | 30 |
| 15 | RS_6F_Sp2_ST7_08242011_500_UHPAr_Heat PT_550UHPAr | UHP Ar | 500 | 120 | UHP Ar | 550 | — |
| 16 | RS_6F_Sp2_ST7_08242011_500_UHPArr_08302011_HPT_53ppm | — | — | — | 53 ppm O2 + Ar | 550 | 30 |
| 17 | RS_6F_Sp2_ST7_0912-132011_500_UHPAr_HPT_10ppm | UHP Ar | 500 | 120 | 10 ppm O2 + Ar | 550 | 10 |
| 18 | RS_6F_Sp2_ST7_0915-162011_500_UHP Ar_HPT_550_24ppm | UHP Ar | 500 | 120 | 24 ppm O2 + Ar | 550 | 0 |

| | 6FDA-BPDA-DAM STATE | OD μ | $P/l_{O2}$ GPU | $P/l_{N2}$ GPU | α $O_2/N_2$ | Stage cut SC | Required Area $m^2$ |
|---|---|---|---|---|---|---|---|
| 1 | ST7-POLYMER | 395 | 121 | 35.7 | 3.39 | 0.482 | 99.4 |
| 2 | RS_6F_Sp2_ST7_06162011_550_UHP Ar | 298 | 38 | 4.6 | 8.28 | 0.310 | 298.2 |
| 3 | RS_6F_Sp2_ST8_06212011_550_UHP Ar | 200 | 35 | 4.8 | 7.29 | 0.335 | 354.6 |
| 4 | RS_6F_Sp2_ST7_06263011_500_4h | 287 | 47 | 7.3 | 6.44 | 0.380 | 240.2 |
| 5 | RS_6F_Sp2_ST7_06302011_500_Hramp | 300 | 55 | 9.5 | 5.79 | 0.365 | 205.3 |
| 6 | RS_6F_Sp2_ST7_07082011_500_1ppm | 296 | 54 | 10.2 | 5.29 | 0.380 | 206.1 |
| 7 | RS_6F_Sp2_ST7_07082011_500_1ppm_Heat PT_08092011_550 | 287 | 43.74 | 5.27 | 8.30 | 0.315 | 267.3 |
| 8 | RS_6F_Sp2_ST7_07112011_500_Hramp_1ppm | 302 | 69.5 | 10.6 | 6.56 | 0.3501 | 169.0 |
| 9 | RS_6F_Sp2_ST7_07132011_500_10ppm_mod2 | 305 | 46.7 | 7.5 | 6.23 | | |
| 10 | RS_6F_Sp2_ST7_07192011_500_32ppm | 303 | 51.1 | 7.12 | 7.18 | | |
| 11 | RS_6F_Sp2_ST7_07272011_500_53ppm | 299 | 47.3 | 7.7 | 6.14 | | |

TABLE 5-continued

Carbon Membrane for O₂/N₂

| | | | | | | |
|---|---|---|---|---|---|---|
| 12 | RS_6F_Sp2_ST7_07272011_500_53ppm_08272011_HPT_53ppm | 295 | 16.12 | 1.19 | 13.55 | |
| 13 | RS_6F_Sp2_ST7_08042011_525_53ppm | 297 | 31.05 | 3.91 | 7.94 | 0.320 | 369.7 |
| 14 | RS_6F_Sp2_ST7_08042011_525_53ppm_HeatPT_08092011_53ppm | 290 | 29.8 | 3.1 | 9.61 | 0.270 | 611.6 |
| 15 | RS_6F_Sp2_ST7_08242011_500_UHPAr_HeatPT_550UHPAr | 304 | 55.29 | 6.62 | 8.35 | |
| 16 | RS_6F_Sp2_ST7_08242011_500_UHPAr_08302011_HPT_53ppm | 290 | 13.87 | 1.59 | 8.72 | |
| 17 | RS_6F_Sp2_ST7_0912-132011_500_UHPAr_HPT_10ppm | 300 | 34.18 | 2.68 | 12.75 | 0.270 | 372.0 |
| 18 | RS_6F_Sp2_ST7_0915-162011_500_UHPAr_HPT_550_24ppm | 300 | 35.29 | 3.5 | 10.03 | 0.290 | 337.9 |

Figure 10:
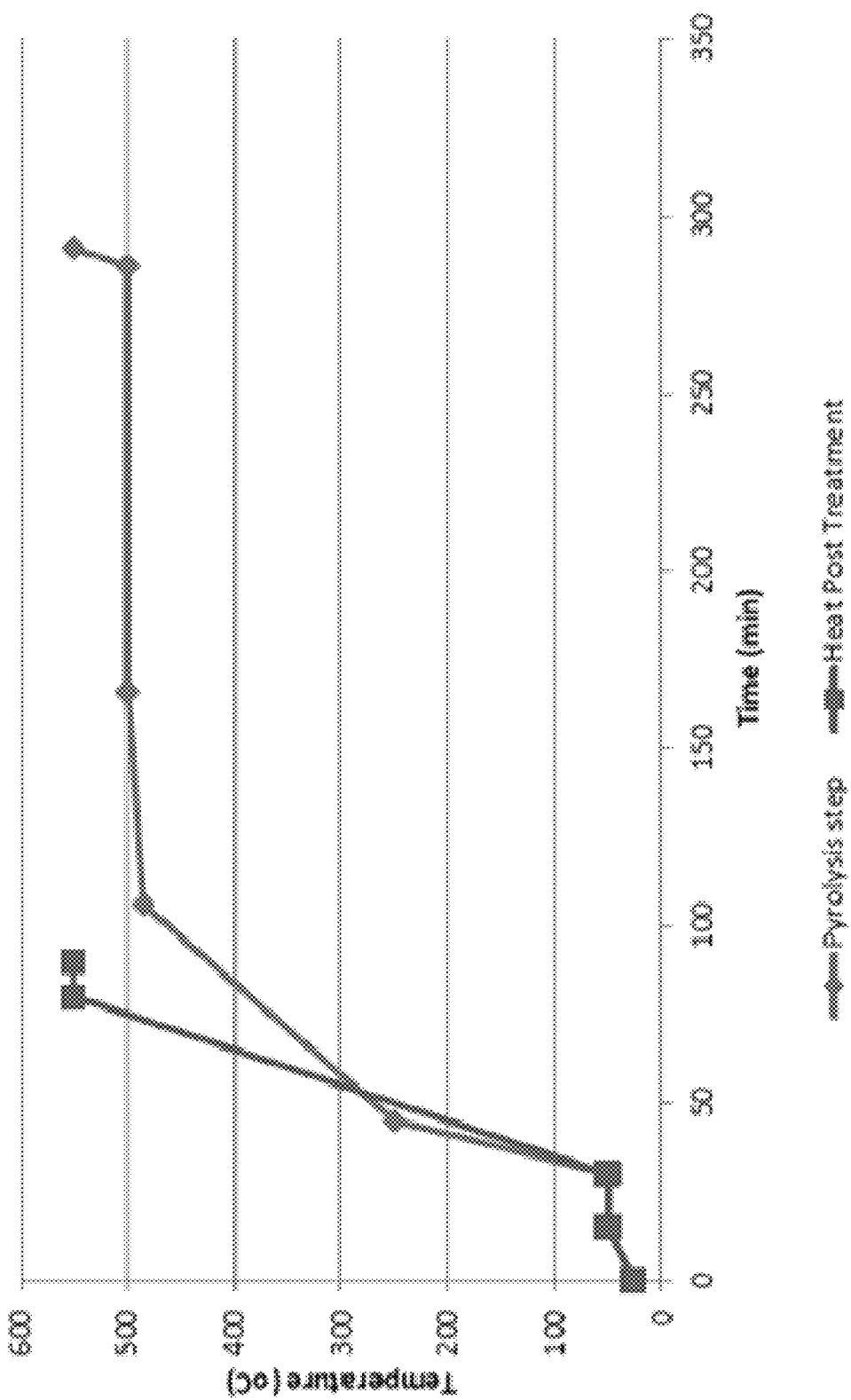
FIG. 10 illustrates pyrolysis temperature protocol with heat post treatment step, in accordance with an exemplary embodiment of the disclosure.

As can be seen in table 5, on heat post treatment, a huge improvement in selectivity is observed. CMS membrane prepared under 1 ppm oxygen (balanced argon) atmosphere at 500° C. pyrolysis temperature, gave 8.3 (compared to 5.3) $O_2/N_2$ selectivity on heat post treatment at 550° C. (item 6 & 7 in table 5). The $O_2/N_2$ selectivity of CMS membrane prepared in the presence of 53 ppm oxygen and 525° C. pyrolysis protocol was improved to 9.6 from 7.9 on heat post treatment (item 13 & 14 in table 5). Later on, we compile the first pyrolysis step with heat post treatment and following table 6 and FIG. 10 show the temperature programs used. Their permeation properties are already given in table 5 (item 17 & 18 in table 5).

TABLE 6

Pyrolysis temperature protocol with heat post treatment step.

| | $T_{initial}$(° C.) | $T_{final}$(° C.) | Ramp Rate (° C./min)/total time (min) |
|---|---|---|---|
| HEAT POST TREATMENT | 26 | 50 | 15 min soak |
| | 50 | 250 | 13.3/15 |
| | 250 | 485 | 3.85/61 |
| | 485 | 500 | 0.25/60 |
| | 500 | 500 | 2 hr soak |
| | 500 | 550 | 10.0/5 min |
| | 26 | 50 | 15 min soak |
| | 50 | 550 | 50 min @ 10 |
| | 550 | 550 | 10 min |

Example 3

Efforts to test and develop the membranes also required some development for securing the hollow fiber membranes to the apparatus.

Permeation Test at Elevated Temperature.

Epoxy leakage was a challenge faced during experiments at high temperature. For the testing at 35° C. normally 5 min epoxy (Scotch-Weld epoxy adhesive, 3-5 min curing) is used, which works well at this temperature. Due to limitation of working temperature to 60° C. with 5 minute, high temperature epoxies were used to seal the ends. In the following section details are given regarding high temperature epoxies used in the present study:

a. DURALCO 4525 epoxy (500 F)
b. STYCAST (Emerson and Cuming STYCAST 2651-40)

Figure 11:
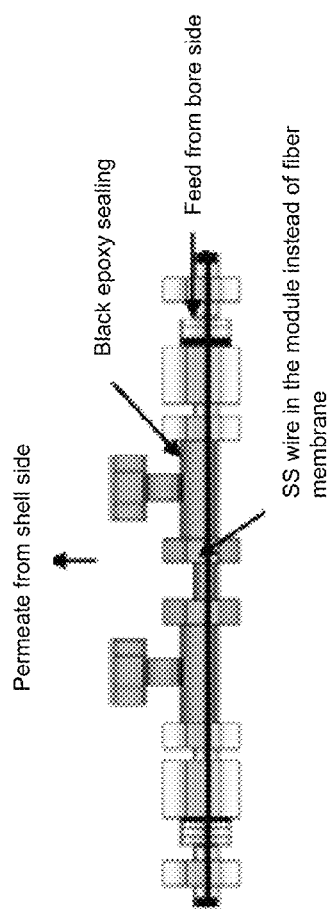
FIG. 11 illustrates a schematic of an epoxy-wire module, in accordance with an exemplary embodiment of the disclosure.

Initially, it seemed that these epoxies were working well for the study at high temperature, however, repeated observation of very low selectivity at higher temperatures made us to suspect leakage at the epoxy-fiber interface. To explore this issue, we proposed the epoxy-wire module testing. Schematic of epoxy-wire module is given in FIG. 11, where a solid wire of stainless steel/brass is used in place of CMS membrane.

Figure 12:
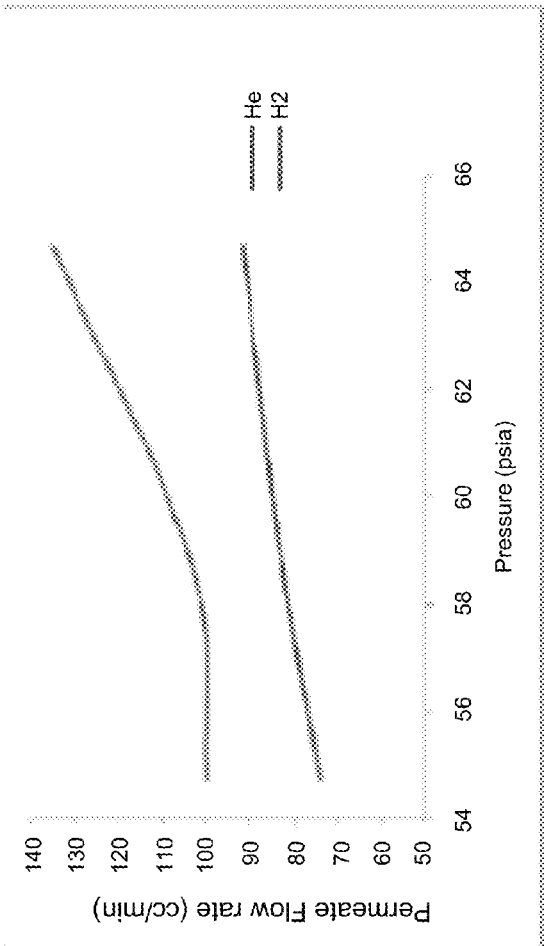
FIG. 12 illustrates a plot of permeate flow rate of wire-DURALCO module with time, in accordance with an exemplary embodiment of the disclosure.

Two different modules are prepared for the two types of black epoxies (DURALCO & STYCAST) and exposed to pure gas feeds (~55 psia pressure) at 71.1° C. temperature. Ideally there shouldn't be any flux in the permeate side, but DURALCO 4525 is leaky since the beginning, which suggests problem at the epoxy-wire interface (table 7, FIG. 12). STYCAST 2651-40 performed well up to ~200 hours but started leaking without selectivity.

TABLE 7

Permeate flow rate of wire-DURALCO module with time

DURALCO

| | after 92 hr | |
|---|---|---|
| | Feed Pressure | flow rate (from digital bubble flow meter) |
| GAS | psig | cc/min |
| He | 64.69 | 135 |
| | 58.69 | 103 |
| | 54.69 | 99.8 |
| N2 | 64.69 | 91.9 |
| | 58.69 | 82.8 |
| | 54.69 | 74.1 |

Heat post curing at 65° C. for 2 hours improved the working performance of SCTCAST 2651-40 and no leaks were observed for longer hours, however, the problem with testing CMS membrane modules at elevated temperatures still existed. No leaks were observed with wire-epoxy modules, but with CMS membranes modules, the selectivity dropped on increasing the temperature from 35 to even 45° C. This indicates poor interfacial adhesion between CMS and STYCAST epoxy. The smooth and inert surface of CMS membrane doesn't provide a proper adhesion compared to polymer membranes or wire. Modification of the carbon surface coming in contact with epoxy, might help in eliminating poor adhesion problem. On the other hand, we are also testing other high temperature epoxy, i.e., DURALCO 4460 can work up to 600° F./315.5° C. This epoxy is very low in viscosity and cures at high temperatures (120° C.) and may cause leak through Teflon worm. The possible solution is to partially cure the weighed epoxy-hardener mixture at 120° C. and then pour into module or faster curing at higher temperature, i.e., 175 or 230° C. All the challenges being faced with epoxy sealing is summarized in table 8 with possible solutions and remarks.

TABLE 8

Challenges and recommendation for high temperature permeation study.

| EPOXY TYPE | CHALLENGES AT HIGH TEMPERATURE | SOLUTIONS | REMARKS |
|---|---|---|---|
| High temperature epoxy DURALCO 4525 | Extruder from Teflon bol | Epoxy is poured after partial curing | No extrusion of epoxy |
| STYCAST 265I-40 | Leaky | STYCAST 265I-40 | |
| | Leak from Carbon fiber and epoxy interface | Heat post curing | Still Leaky at interface with CMS membranes |
| | Leak from Carbon fiber and epoxy interface | Surface activation of carbon membrane | Still need more study |
| DURALCO 4460 was tested | This epoxy has very low viscosity and outes at 120° C. in 4 hours | Starts hardening from 30-60 min of exposure to 120° C. and can be poured during this time in to pos/curing at higher temperature i.e., 175/230° C. | Needs lot of permeation during making fiber module |

Figure 13:
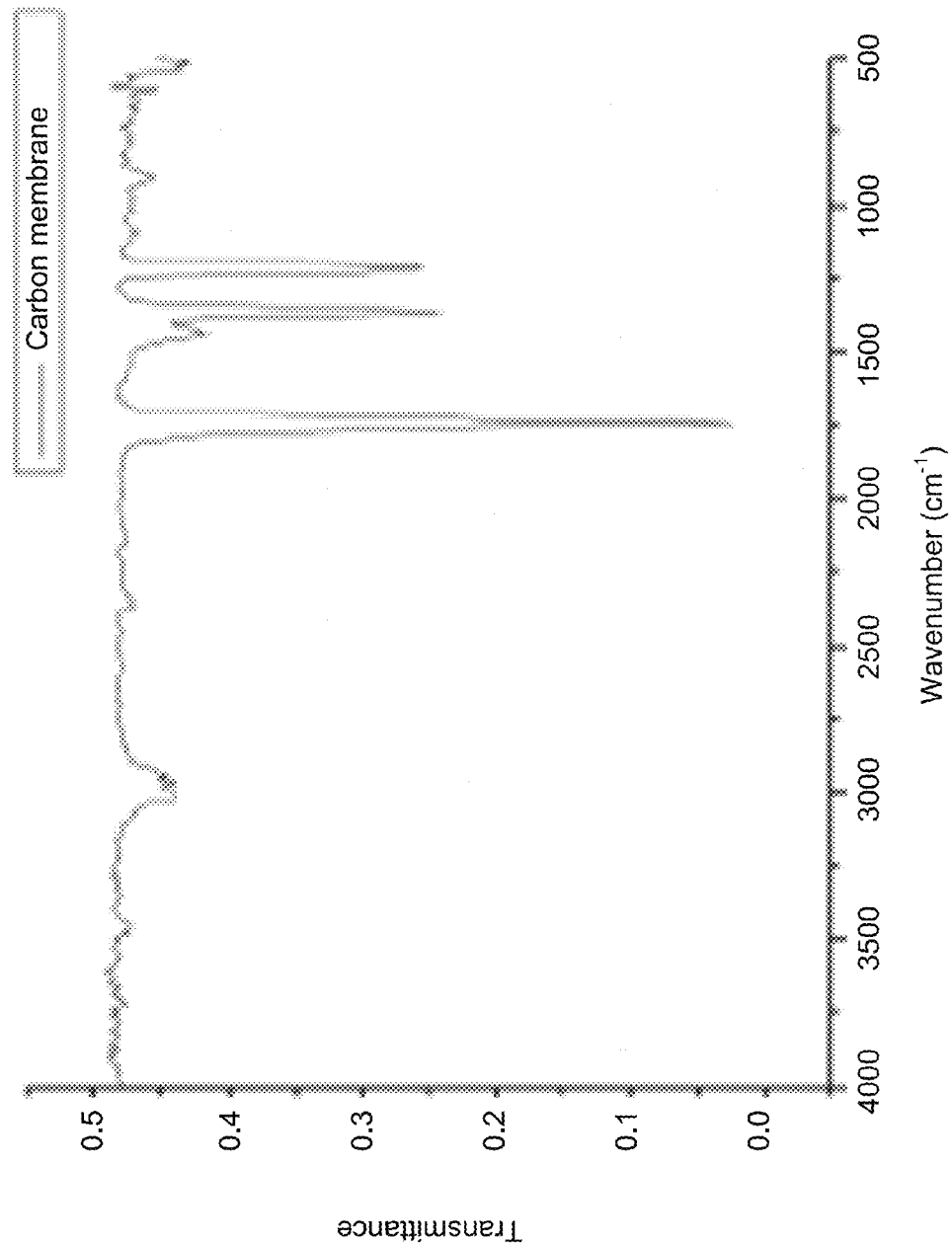
FIG. 13 illustrates the FTIR spectrum of CMS membrane of surface treatment, in accordance with an exemplary embodiment of the disclosure.

Oxidation of Carbon Membrane Surface:

The portion of CMS membrane surface that will come into contact with epoxy on module preparation was modified by oxidation to introduce acidic groups on the surface which might help in making better contact with epoxy. FTIR of modified carbon surface is shown in FIG. 13, where the carbonyl peak at ~−1738 cm$^{-1}$ is clearly seen. Fiber module is prepared with precaution so that modified portion doesn't reach the active length of membrane for permeation measurement. STYCAST 2651-40 is used to seal the ends and room temperature followed by heat post curing at 65° C. for 2 hours is done.

To prove the STYCAST malfunctioning, a membrane module with 5-minute epoxy sealing is prepared and tested at 35, 45 and 60° C.

Membrane Performance at High Temperature (60° C./140° F.).

As required, CMS membrane modules prepared from high temperature epoxies were exposed to high temperature, i.e., 71.1° C. (160° F.). Large increases in permeance along with high drop in selectivity are observed in most of the cases (table 9). The huge drop in selectivity at high temperature was unexpected and consistently observed even with highly selective membranes at 35° C. To prove that this problem is due to epoxy sealant, epoxy wire modules are tested as given in previous section. As modules with 5-minute epoxy performed well up to 60° C.

TABLE 9

Performance of CMS membranes at 35 and 71.1° C. (160° F.) and 55 psia feed pressure.

| Sample Code | Testing temperature (° C.) | $P/l_{O2}$ (GPU) | Selectivity ($O_2/N_2$) | Testing temperature (° C.) | $P/l_{O2}$ (GPU) | Selectivity ($O_2/N_2$) |
|---|---|---|---|---|---|---|
| RS_6F_Sp2_ST 7_08042011/08092011_heatPT_550_53ppm | 35 | 29.8 | 9.6 | 71.1 | 53.2 | 3.2 |
| RS_6F_Sp2_ST 7_06162011_550_UHP Ar | 35 | 38 | 8.3 | 71.1 | 59.3 | 3.6 |

Figure 14:
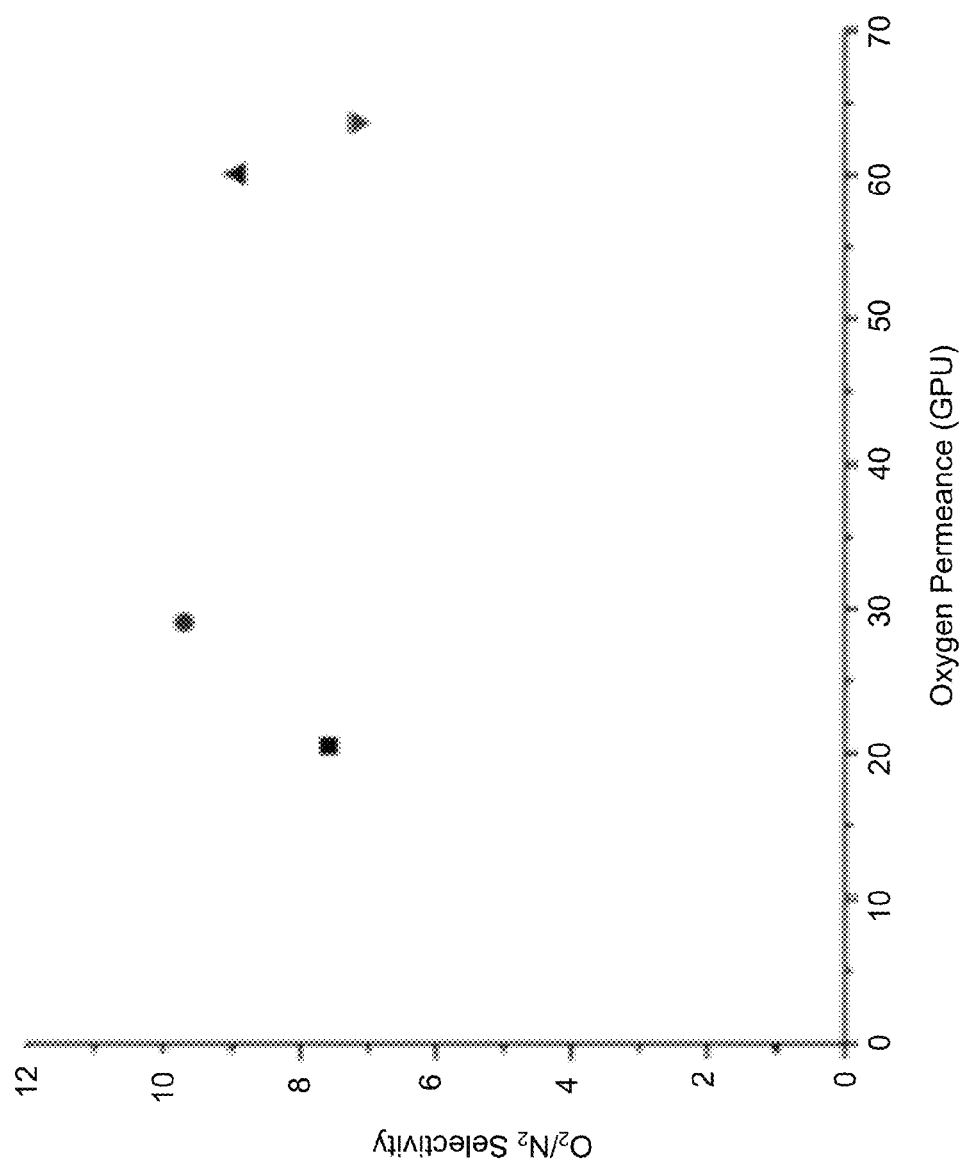
FIG. 14 illustrates a plot of performance of CMS membranes at 60° C. and ~60 psia feed pressure, in accordance with an exemplary embodiment of the disclosure.

Table 10 and FIG. 14 summarize the performance of CMS membranes (sealed with 5 min epoxy) at 60° C. (140° F.). CMS membranes prepared under UHP Ar/500/120 (atmosphere/pyrolysis temperature/soak time) pyrolysis followed by 10 ppmAr/550/10 heat post treatment were found to be the best performing membranes so far with oxygen permeance and selectivity 60.1 and 8.6 respectively. On the basis of permeance values and two different temperatures, activation energy is calculated and used to further calculated the performance at higher temperatures (discussed in below).

TABLE 10

Performance of CMS membranes (sealed with 5 min epoxy) at 60° C. and ~60 psia feed pressure.

| | 6FDA-BPDA-DAM STATE | Pyrolysis Atmosphere | Pyrolysis Temperature (° C.) | Soak Time (hr) | Atmosphere for Heat Post Treatment | Temperature for HPT (° C.) | Soak Time (min) |
|---|---|---|---|---|---|---|---|
| 1 | RS_6F_Sp2_ST7_07082011_500_1ppm_HeatPT_08092011_550 | — | — | — | 53 ppm O2 + Ar | 550 | 30 |
| 2 | RS_6F_Sp2_ST7_07272011_500_53ppm_08272011_HPT_53ppm | — | — | — | 53 ppm O2 + Ar | 550 | 30 |
| 3 | RS_6F_Sp2_ST7_0912-132011_500_UHPAr_HPT_10ppm | UHP Ar | 500 | 120 | 10 ppm O2 + Ar | 550 | 10 |
| 4 | RS_6F_Sp2_ST7_0915-162011_500_UHP | UHP Ar | 500 | 120 | 24 ppm O2 + Ar | 550 | 0 |

TABLE 10-continued

Performance of CMS membranes (sealed with 5 min epoxy) at 60° C. and ~60 psia feed pressure.

| 6FDA-BPDA-DAM STATE | OD μ | P/l$_{O2}$ GPU | P/l$_{N2}$ GPU | α O$_2$/N$_2$ | Stage cut SC | Required Area m$^2$ |
|---|---|---|---|---|---|---|
| 1 RS__6F__Sp2__ST7__07082011__500__1pp m__HeatPT__08092011__550 | 287 | 20.56 | 2.72 | 7.56 | 0.325 | 550.6 |
| 2 RS__6F__Sp2__ST7__07272011__500__53p pm__08272011__HPT__53ppm | 295 | 29.05 | 3 | 9.68 | 0.300 | 416.1 |
| 3 RS__6F__Sp2__ST7__0912-132011__500__UHPAr__HPT__10ppm | 300 | 60.1 | 6.8 | 8.89 | 0.310 | 201.0 |
| 4 RS__6F__Sp2__ST7__0915-162011__500__UHP | 300 | 63.6 | 8.87 | 7.17 | 0.335 | 184.9 |

The sorption-diffusion mechanism has been successfully used in the literature to analyze permeation of molecular sieving media such as CMS and zeolites. Increasing temperature reduces the sorption levels of both gases, while gas diffusion coefficients of both N$_2$ and O$_2$ increase. As a result, permeances for both gas molecules increase with higher temperatures as expected, and selectivity decreases.

Example 4

Activation Energy Calculation

Since the temperature dependence of permeance is often modeled as an Arrhenius-type relationship, using permeance values at different temperatures, apparent activation energies for permeation can be obtained. On the basis of results obtained at two temperatures, i.e., 45 & 60° C., activation energy for oxygen permeance is calculated (table 11), using the following equations:
As, $$P/l = P_o/l \exp(-E_p/RT)$$

Where
P/l=permeance at temperature T (in Kelvin)
P$_o$/l=pre-exponential factor
E$_p$=activation energy of permeation
R=universal gas constant (1.987 cal K$^{-1}$ mol$^{-1}$)
Therefore, for the calculation of permeance at two different temperatures, T$_1$ & T$_2$, the relation will be $$\frac{\left(\frac{P}{l}\right)_2}{\left(\frac{P}{l}\right)_1} = \exp\left[\left\{\frac{-E_D}{R}\left(\frac{1}{T_2} - \frac{1}{T_1}\right)\right\}\right]$$

Temperature Dependence of Transport Properties.

Permeance of a penetrant through a molecular sieving material increases with temperature according to the Arrhenius relationship:

$$P = P_o \exp\left(\frac{E_P}{RT}\right)$$

where,
E$_P$=activation energy for permeation of a penetrant through a given material
P$_O$=temperature independent pre-exponential factor
R=is the universal gas constant
The temperature dependence of permeance reflects the temperature dependence of the diffusion and sorption coefficients as permeance is the product of the two. Diffusion is an activated phenomenon in molecular sieving materials and also increases with temperature according to the Arrhenius relationship:

$$D = D_O \exp\left(\frac{-E_D}{RT}\right)$$

where, D$_O$ and E$_D$ are the pre exponential factor and activation energy of diffusion of a penetrant respectively.
On the other hand, thermodynamic sorption coefficient decreases with temperature according to the van't-Hoff equation:

$$S = S_O \exp\left(\frac{-H_S}{RT}\right)$$

where, H$_S$ is the apparent heat of sorption for a penetrant.

The increase in diffusion coefficient overweighs the decrease in sorption coefficient, resulting in an increase in permeance. The pre-exponential factors and activation energy for permeation can be measured as $$P_o = D_o \cdot S_o$$

$$E_p = E_D + H_S$$

The temperature dependence of permeance is less pronounced than that of diffusion, i.e., the activation energy for permeation is not as high as the activation energy of diffusion. This is a result of negative heat of sorption for most of the materials. In our case (table 11), activation energy for permeation for oxygen and nitrogen are calculated to be 4.8 & 7.5 Kcal/mol respectively. The higher permeation activation energies for the CMS fibers are indicative of activated diffusion processes for molecular sieving materials.

TABLE 11

Calculation of activation energy of permeation of oxygen and nitrogen with Arrhenius equation using experimental permeance values of CMS membrane at two different temperatures.

|  | P$_1$ (GPU) | T$_1$(K) | T$_2$(K) | Activation energy (cal/mol) | P$_2$ (GPU) |  |
|---|---|---|---|---|---|---|
| For O$_2$ | 14.6 | 318 | 333 | 4801.95 | 20.56 | result |
| For O$_2$ | 14.6 | 318 | 308 | 4801.95 | 11.41 | calculation |
| For O$_2$ | 14.6 | 318 | 344.1 | 4801.95 | 25.98 | calculation |
| For O$_2$ | 40 | 308 | 318 | 4801.95 | 51.19 | standard |
| For O$_2$ | 40 | 308 | 333 | 4801.95 | 72.09 | standard |

TABLE 11-continued

Calculation of activation energy of permeation of oxygen and nitrogen with Arrhenius equation using experimental permeance values of CMS membrane at two different temperatures.

| | $P_1$ (GPU) | $T_1$(K) | $T_2$(K) | Activation energy (cal/mol) | $P_2$ (GPU) | |
|---|---|---|---|---|---|---|
| For $O_2$ | 40 | 308 | 344.1 | 4801.95 | 91.11 | standard |
| For $N_2$ | 1.59 | 318 | 333 | 7531.29 | 2.72 | result |
| For $N_2$ | 1.59 | 318 | 308 | 7531.29 | 1.8 | calculation |
| For $N_2$ | 1.59 | 318 | 344.1 | 7531.29 | 3.93 | calculation |
| For $N_2$ | 3.33 | 308 | 318 | 7531.29 | 4.9 | standard |
| For $N_2$ | 3.33 | 308 | 333 | 7531.29 | 8.39 | standard |
| For $N_2$ | 3.33 | 308 | 344.1 | 7531.29 | 12.11 | standard |

Figure 15:
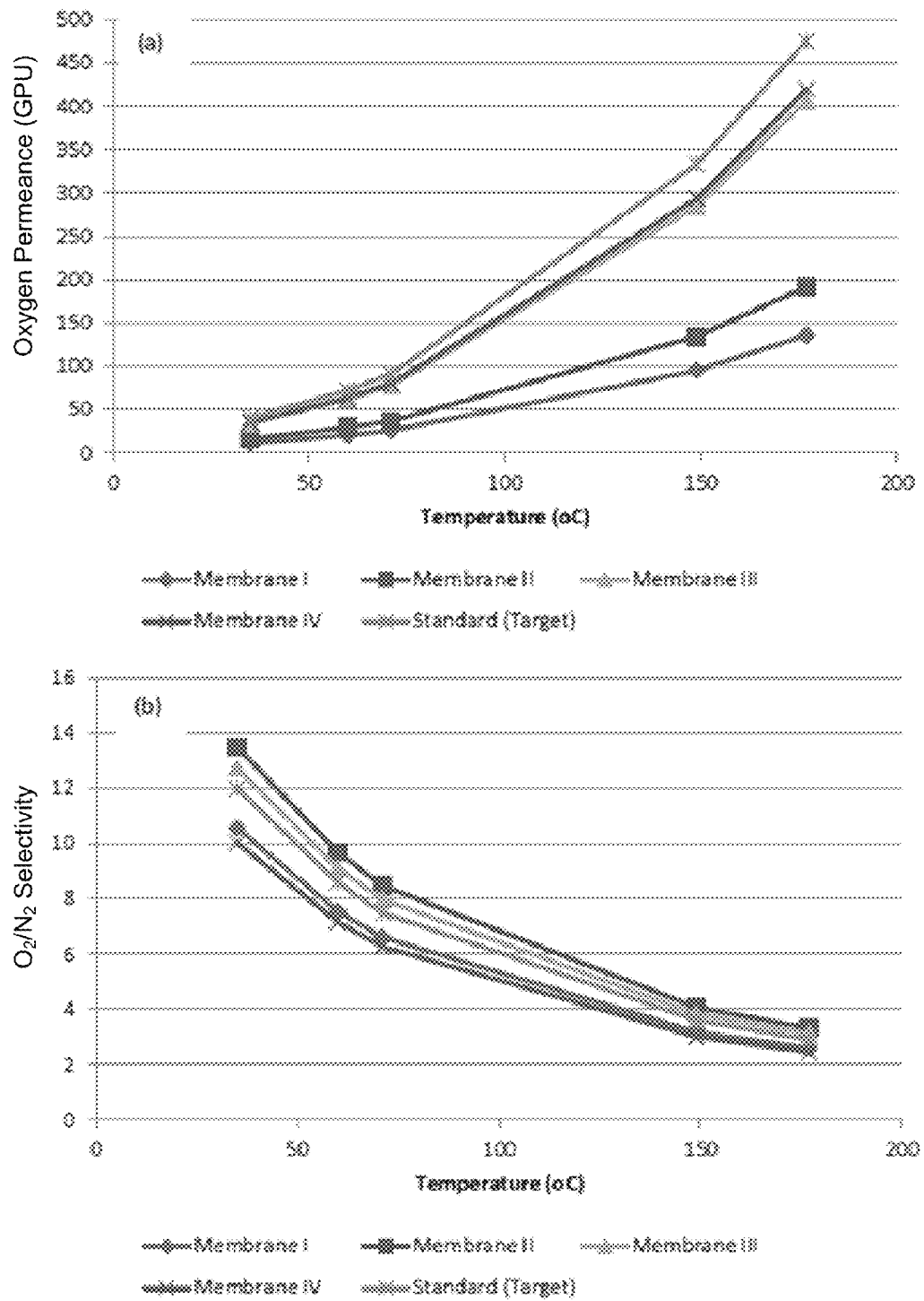
FIG. 15 illustrates a comparative plot of (a) oxygen permeance and (b) $O_2/N_2$ selectivity at different temperatures for given membranes and target membrane, in accordance with an exemplary embodiment of the disclosure.

Following table 12 summarizes the values of oxygen and nitrogen permeances and selectivity at higher temperatures using the activation energies as calculated above for oxygen and nitrogen for different membranes. These CMS membranes (membrane I, II, III & IV) are prepared under different pyrolysis conditions as given in table 10. Comparative plot with target membrane is given in FIGS. 15 *a* & *b*. The temperatures are 308 K (35° C./95° F.), 333 K (60° C./140° F.), 344.1 K (71.1° C./160° F.), 422 K (149° C./300° F.), 450 K (177° C./400° F.).

TABLE 12

Calculation of Performance of different membranes at different given temperatures.

| | Temperature (K) | O2 (GPU) | N2 (GPU) | Selectivity |
|---|---|---|---|---|
| Membrane (I) | 308 | 114.41 | 1.08 | 10.56 |
| | 333 | 20.56 | 2.72 | 7.56 |
| | 344.1 | 25.98 | 3.93 | 6.61 |
| | 422 | 95 | 30 | 3.17 |
| | 450 | 135.67 | 52.46 | 2.59 |
| standard | 308 | 40 | 3.33 | 12.0 |
| | 333 | 72.09 | 8.39 | 8.6 |
| | 344.1 | 91.11 | 12.11 | 7.5 |
| | 422 | 333.12 | 92.52 | 3.6 |
| | 450 | 475.73 | 161.78 | 2.9 |
| Membrane (II) | 308 | 16.12 | 1.19 | 13.55 |
| | 333 | 29.05 | 3 | 9.68 |
| | 344.1 | 36.71 | 4.33 | 8.48 |
| | 422 | 134.23 | 33.09 | 4.06 |
| | 450 | 191.7 | 57.86 | 3.31 |
| Membrane (III) | 308 | 34.18 | 2.68 | 12.75 |
| | 333 | 61.61 | 6.76 | 9.11 |
| | 344.1 | 77.86 | 9.76 | 7.58 |
| | 422 | 284.69 | 74.56 | 3.82 |
| | 450 | 406.56 | 130.37 | 3.12 |
| Membrane (IV) | 308 | 35.29 | 3.52 | 10.03 |
| | 333 | 63.6 | 8.87 | 7.17 |
| | 344.1 | 80.38 | 12.81 | 6.27 |
| | 422 | 293.69 | 97.83 | 3.00 |
| | 450 | 419.69 | 171.07 | 2.45 |

Example 5

Various researchers have reported that the adsorption of water is strongly influenced by various factors such as the nature of carrier, temperature, and the humidity's partial pressure. According to Gawryz et. al., only active polar centers seem to be involved at relatively low humidity and this adsorption is so weak that the negative effect on separation can be easily removed. When relative humidity is more than 25%, the negative effect on separation may be substantial. Hydrogen bonding between neighboring water molecules leads to clusters of adsorbed water, which may impede permeation. Other researchers also documented carbon materials experiencing severe loses of transport properties under humid rich environment. Currently, an adequate solution to this phenomenon has not been fully explored. Jones and Koros developed a coating method on the CMS fiber using unique polymeric materials and saw significant improvements. This method utilizes Teflon AF2400 which is highly hydrophobic yet does not prohibitively reduce the flux of other permeating species. As a result of this coating, % O2 flux loss was improved by 40% while maintaining the selectivity of $O_2/N_2$ separation. In the study, permeation was carried out under a feed pressure of 105 psi and the CMS fiber membrane was exposed to humid air for 24 hours. Kiyono also studied the effect of humidified feed (80% RH) on asymmetric hollow fiber CMS membranes (prepared by oxygen doping during pyrolysis) and concluded that CMS membranes not only demonstrate durability against humidity but also show the stability of CMS membranes prepared with the oxygen "doping" method.

Experiments and Results.

Figure 16:
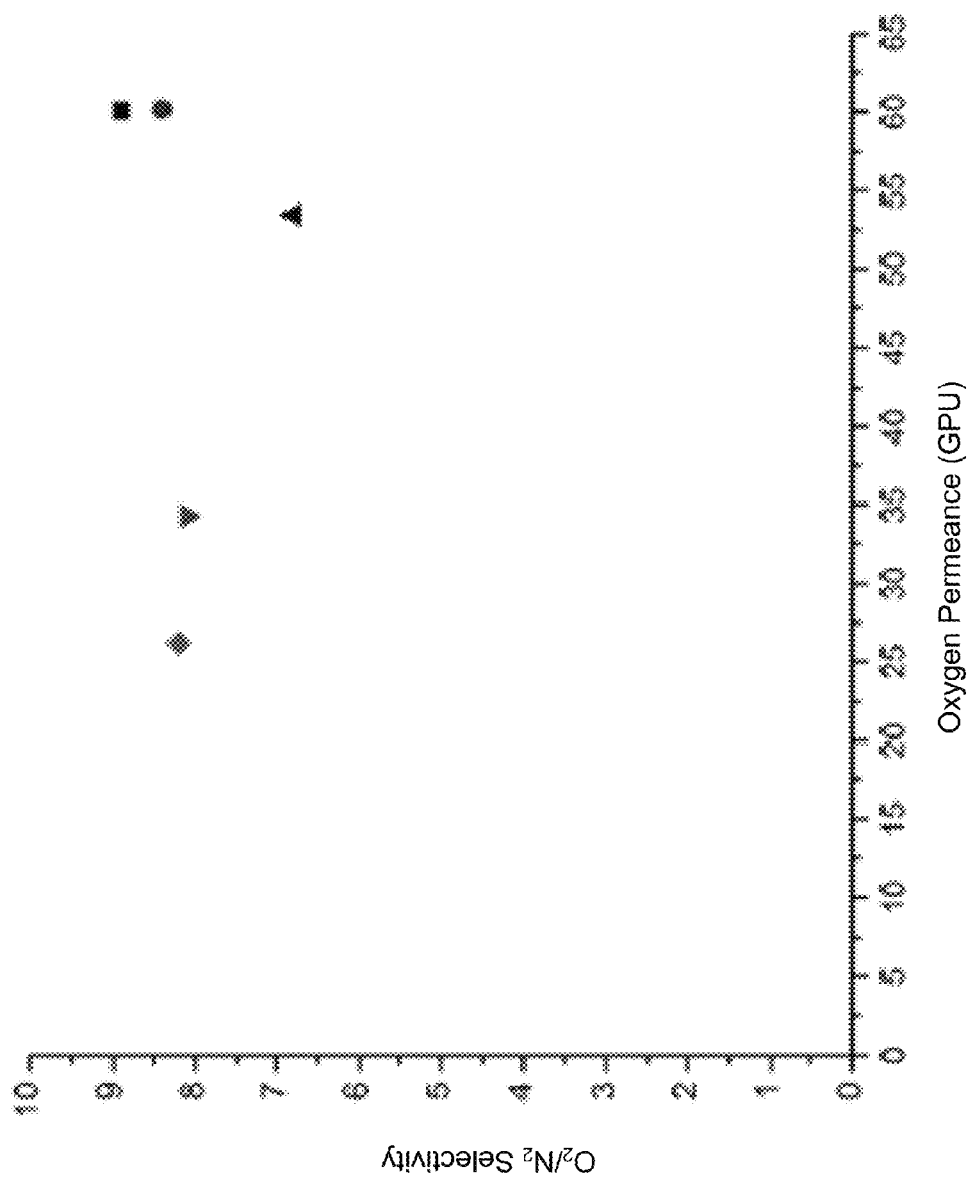
FIG. 16 illustrates a plot of change in oxygen permeance of CMS membrane on exposure to humidified oxygen feed stream, in accordance with an exemplary embodiment of the disclosure.
Figure 17:
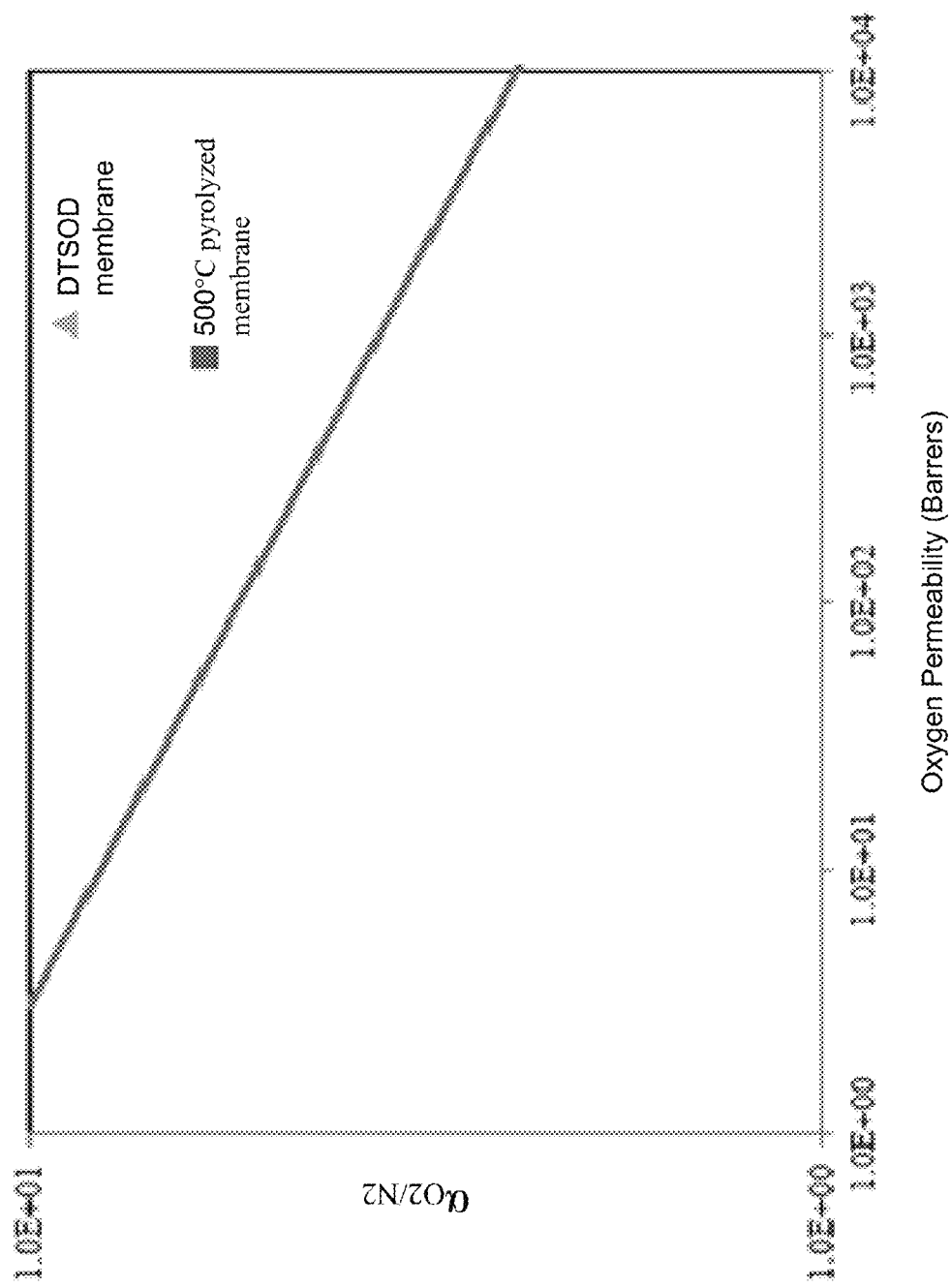
FIG. 17 illustrates a plot of Oxygen Permeability and $O_2/N_2$ selectivity for CMS and DTSOD membranes, in accordance with an exemplary embodiment of the disclosure.
Figure 18:
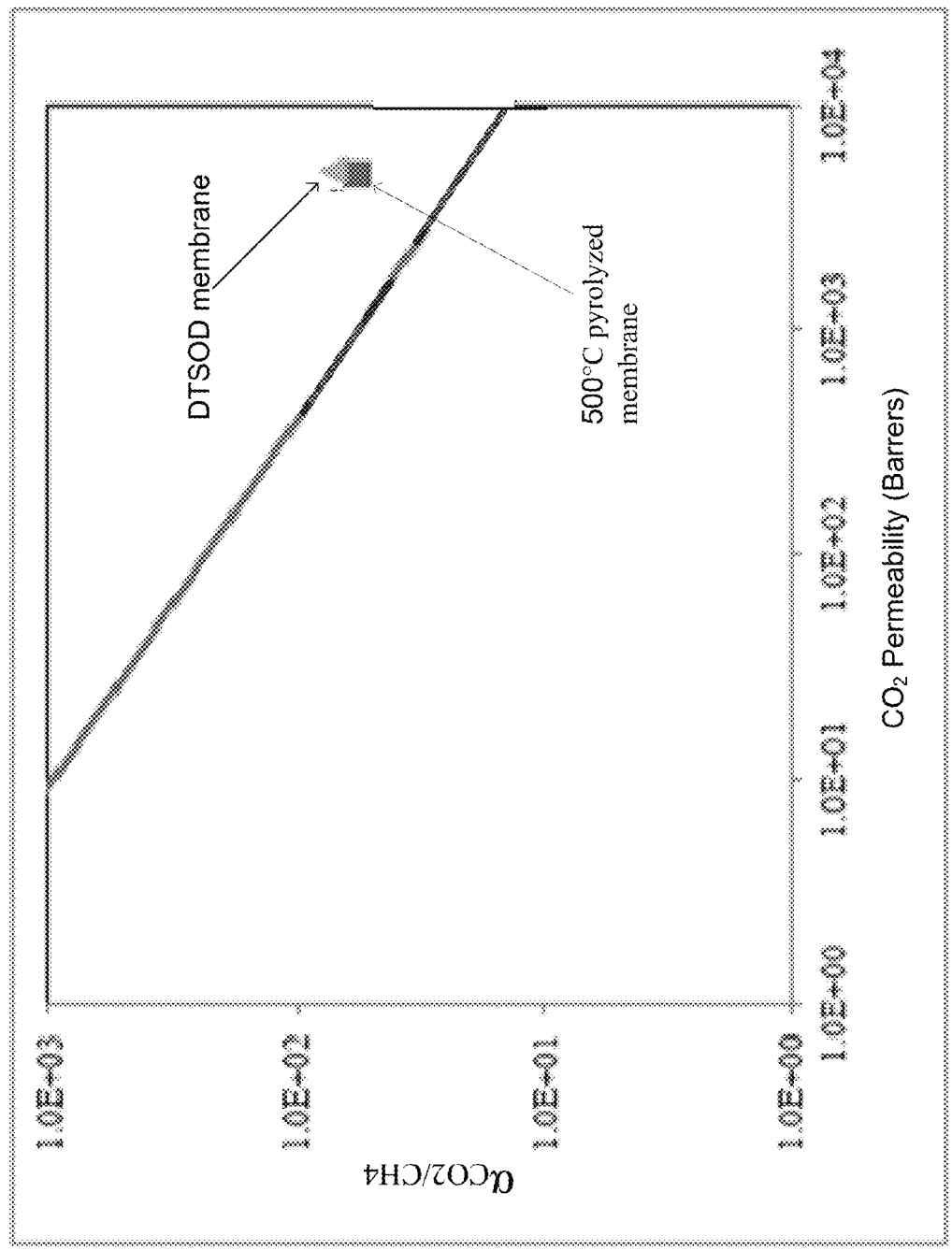
FIG. 18 illustrates a plot of Oxygen Permeability and $CO_2/CH_4$ selectivity for CMS and DTSOD membranes, in accordance with an exemplary embodiment of the disclosure.
Figure 19:
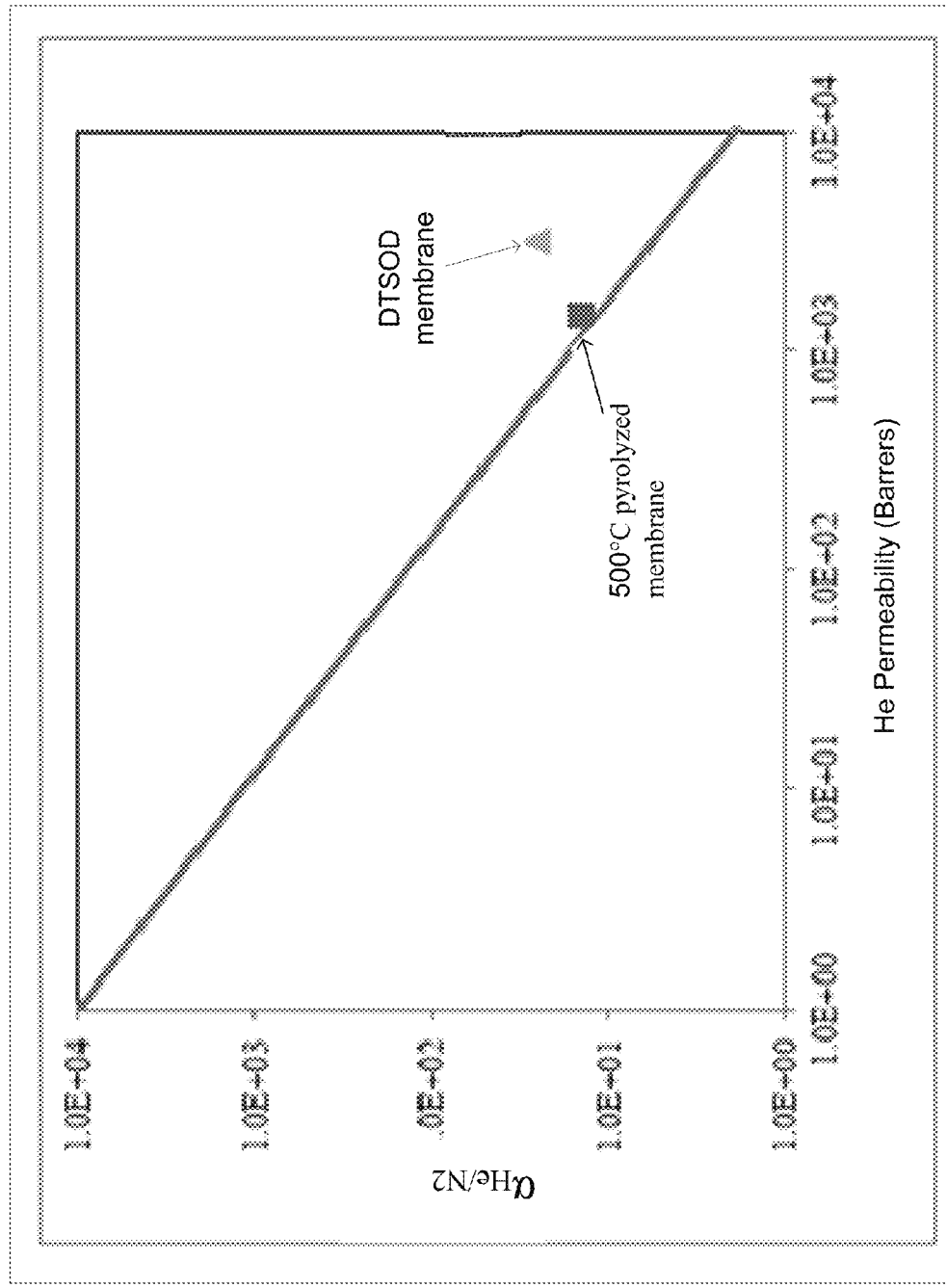
FIG. 19 illustrates a plot of Oxygen Permeability and $He/N_2$ selectivity for CMS and DTSOD membranes, in accordance with an exemplary embodiment of the disclosure.

In the present study, CMS membrane with 60.1 GPU oxygen permeance and 8.9 selectivity over nitrogen was exposed to humidified feed stream carrying 158 grains/lb of gas (60 psia feed pressure) for 100 hours at 60° C. (140° F., ~80% RH). To observe the effect of humidity on membrane performance, oxygen is used as the carrier gas and permeance is measured at different intervals (table 13, FIG. 16, with 158 grains of water/lb of oxygen at 60 C and 60 psia feed pressure and wherein data point in black is the intrinsic oxygen permeance value before exposure). Selectivity drops by 5% after 1 hr of exposure with no change in oxygen permeance. After 3 hours of exposure 11% and 24% drop in oxygen permeance and $O_2/N_2$ selectivity is seen respectively. However, after 52 hours of exposure $O_2/N_2$ selectivity starts to increase and reaches to 8.1 (compared to intrinsic 8.9) after 100 hours of exposure. Total loss of 54% in oxygen permeance is recorded after 100 hours of exposure. It can be hypothesized that water molecules are first attacking the micropore sites and reducing both permeance and selectivity of the membrane due to loss in sorption sites for gases and later on, on ultramicropores also, making the membrane more selective along with the loss in permeance.

The actual difference between the two temperatures is the relative humidity, which is almost double at 60° C. and making such difference in performance. We hope that CMS membranes will behave similar to what shown in the last report at 71.1° C.

TABLE 13

Change in performance of CMS membrane on exposure to 158 grains of water/lb of oxygen at 60° C. 60 psia feed pressure is used in the study and permeance are determined using the standard isochoric technique. Oxygen permeance was measure at regular interval and nitrogen permeance was measured after 100 hours of exposure.

| Gas | Temp (K) | dP/dt (torr/sec) | Upstream Pressure (psia) | Downstream Volume (cc) | Flow Rate (cc/sec) | Oxygen Permeance (GPU) | Selectivity O2/N2 | Feed side/time of exposure |
|---|---|---|---|---|---|---|---|---|
| O2 | 333 | 0.4092 | 57.9 | 46 | 2.032E-02 | 60.10 | 8.9 | bore/0 hr |
| N2 | 333 | 0.0473 | 59.5 | 46 | 2.348E-03 | 6.76 | | bore/0 hr |

TABLE 13-continued

Change in performance of CMS membrane on exposure to 158 grains of water/lb of oxygen at 60° C. 60 psia feed pressure is used in the study and permeance are determined using the standard isochoric technique. Oxygen permeance was measure at regular interval and nitrogen permeance was measured after 100 hours of exposure.

| Gas | Temp (K) | dP/dt (torr/sec) | Upstream Pressure (psia) | Downstream Volume (cc) | Flow Rate (cc/sec) | Oxygen Permeance (GPU) | Selectivity $O_2/N_2$ | Feed side/time of exposure |
|---|---|---|---|---|---|---|---|---|
| O2 | 333 | 0.4204 | 59.3 | 46 | 2.087E−02 | 60.29 | 8.4 | bore/1 hr |
| N2 | 333 | 0.0540 | 63.9 | 46 | 2.681E−03 | 7.19 |  | bore/1 hr |
| O2 | 333 | 0.3211 | 52.5 | 46 | 1.594E−02 | 52.01 | 6.6 | bore/3 hr |
| O2 | 333 | 0.3293 | 52.4 | 46 | 1.635E−02 | 53.44 | 6.8 | bore/3 hr |
| N2 | 333 | 0.0550 | 59.1 | 46 | 2.731E−03 | 7.91 |  | bore/3 hr |
| O2 | 333 | 0.2235 | 55.4 | 46 | 1.110E−02 | 34.31 | 8.1 | bore/52 hr |
| N2 | 333 | 0.0308 | 61.9 | 46 | 1.529E−03 | 4.23 |  | bore/52 hr |
| O2 | 333 | 0.1800 | 58.5 | 46 | 8.937E−03 | 26.17 | 8.2 | bore/100 hr |
| N2 | 333 | 0.0236 | 62.8 | 46 | 1.172E−03 | 3.20 |  | bore/100 hr |

Example 6

Preparation of 6FDA/BPDA-DAM Dense Films

To study the applicability of the DTSOD method, dense films of 6FDA/BPDA-DAM polymer were prepared and pyrolyzed to prepare CMS dense film membranes. Polymer powder was dried under vacuum at 110° C. over night to remove moisture. A polymer solution (6 wt %) was prepared by dissolving in dichloromethane (99.99% purity from Aldrich), in a 40 ml ICHEM vial (Fisher Scientific), and placed on a roller for at least 12 hours for preparation of a homogeneous dope. Dense films were prepared by solution casting at room temperature. The polymer solution was transferred in a glass syringe, filtered through a Millex®-RH 0.45 micron PTFE filter (Millipore Corporation), and slowly extruded onto a Teflon dish. The entire procedure was performed in a glove bag to control the solvent evaporation rate. It was essential to prepare flat polymeric films to produce flat CMS membranes during the solution casting procedure. The Teflon dish produced flat polymeric films and on pyrolysis the CMS membranes were also flat.

Preparation of CMS Dense Film Membranes.

Polymer films were placed on a quartz plate, which was ridged to allow for the diffusion of volatile by-products from the top and bottom of the films into the effluent stream, and loaded into the pyrolysis system (same system used for fibers). Between experiments, the quartz tube and plate were rinsed with acetone (Aldrich) and baked in air at 800° C. to remove any residues. Two different sets of CMS dense films were prepared, i.e., pyrolyzed at 500° C. with a two hour soak time and the other was by the DTSOD method. The pyrolysis protocols used were same as given in table 2a & 2d respectively.

Permeation Results.

CMS films were loaded into a permeation cell for testing. Carbon films were first masked using impermeable aluminum tape, and only a specific area was exposed for permeation. The interface of the tape and the film was further sealed with epoxy (DP100, Scotch Weld) to minimize potential gas leaks. This assembly was placed in a double O-ring flange permeation cell and the cell was tested in a constant-volume-variable-pressure permeation system. The permeability data for the two types of CMS dense films for different gases are given in table 14. As can be seen, a significant increase in selectivity for $O_2/N_2$, $CO_2/CH_4$, $He/N_2$ and $He/SF_6$ gas pairs was obtained in DTSOD membranes; which are effectively sieving large size gas molecules as very low permeability for $SF_6$ molecules was observed in DTSOD membranes compared to 500° C. pyrolyzed membranes. Thus, DTSOD is an effective tool to tune the selectivities for different gas pairs compared to oxygen doping during pyrolysis. DTSOD membranes are effectively doped with oxygen molecules in the secondary oxidative temperature treatment, making them more selective for large sized gas molecules ($N_2$, $CH_4$, $SF_6$). On the other hand, permeabilities of small sized molecules ($O_2$, $CO_2$, He) are also increased. In all cases, the DTSOD membranes performance is well above the Robeson trade-off curve (FIGS. 21, 22 and 23).

TABLE 14

Permeability and selectivity data at 35° C. for different gas pairs for CMS dense film membranes prepared by (1) pyrolysis at 500° C., and (2) DTSOD

| Gas | Test Temperature (° C./° F.) | Permeability (Barrers) CMS film_500 C pyrolysis | Selectivity | Permeability (Barrers) DTSOD CMS film | Selectivity |
|---|---|---|---|---|---|
| O2 | 35/95 | 852 | 6 $O_2/N_2$ | 1110 | 9 $O_2/N_2$ |
| $N_2$ | 35/95 | 143 |  | 128 |  |
| CO2 | 35/95 | 4961 | 57 $CO_2/CH_4$ | 5133 | 71 $CO_2/CH_4$ |
| $CH_4$ | 35/95 | 87 |  | 72 |  |
| He | 35/95 | 1437 | 10 $He/N_2$ | 3139 | 25 $He/N_2$ |
| $SF_6$ | 35/95 | 14 | 103 $He/SF_6$ | 0.16 | 19619 $He/SF_6$ |
| $C_2H_4$ |  |  |  | 152.6 | 5.5 |
| $C_2H_6$ |  |  |  | 27.8 |  |
| C2H4/C2H6 |  | 36.7% $C_2H_6$ WITH BALANCED $C_2H_4$ |  | 98 | 6.2 |

The following publications in their entireties are hereby incorporated by reference into this application as if fully set forth herein in order to more fully describe the state of the art to which the disclosed matter pertains.

Kiyono M, Williams P J, Koros W J. Effect of pyrolysis atmosphere on separation performance of carbon molecular sieve membranes. J Membr Sci 2010; 359(1-2):2-10.

Rungta M, Xu L, Koros W J. Carbon molecular sieve dense film membranes derived from Matrimid® for ethylene/ethane separation. Carbon (2012);50(4):1488-1502.

Pye D G, Hoehn H H, Panar M. Measurement of gas permeability of polymers. II. Apparatus for the determination of permeabilities of mixed gases and vapors. J Appl Polym Sci (1976);20(2):287-301.

Pye D G, Hoehn H H, Panar M. Measurement of gas permeability of polymers. I. Permeabilities in constant volume/variable pressure apparatus. J Appl Polym Sci (1976);20(7):1921-1931.

Robeson L M. The upper bound revisited. J Membr Sci (2008); 320(1-2):390-400.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

We claim:

1. A carbon molecular sieve prepared by a method comprising:
    pyrolyzing a polymer membrane in a first heat treatment in a first oxygen environment comprising less than 5 ppm oxygen; and
    subjecting the pyrolyzed polymer membrane to a second heat treatment in a second oxygen environment;
    wherein the second heat treatment occurs at a temperature above the first heat treatment; and
    wherein the second oxygen environment has a higher concentration of oxygen than the first oxygen environment.

2. The carbon molecular sieve of claim 1, wherein the pyrolysis is conducted at between 400 and 500° C.

3. The carbon molecular sieve of claim 1, wherein the first oxygen environment comprises less than 2 ppm oxygen.

4. The carbon molecular sieve of claim 1, wherein the second oxygen environment comprises more than 5 ppm oxygen.

5. The carbon molecular sieve of claim 1, wherein the second oxygen environment comprises about more than 10 ppm oxygen.

6. The carbon molecular sieve of claim 1, wherein the carbon molecular sieve has an oxygen/nitrogen selectivity of greater than 7.1, and an oxygen permeance of at least 13.8 GPU (1 GPU=$10^{-6}$ $cm^3$(STP)/($cm^2$ sec cmHg)=$3.35 \times 10^{-10}$ mol/($m^2$ s Pa)).

7. The carbon molecular sieve of claim 1, wherein the carbon molecular sieve has an oxygen/nitrogen selectivity of greater than 8, and an oxygen permeance of at least 13.8 GPU.

8. The carbon molecular sieve of claim 1, wherein subjecting the pyrolyzed polymer membrane to the second heat treatment is conducted at a temperature of greater than or equal to 500° C.

9. The carbon molecular sieve of claim 1, wherein subjecting the pyrolyzed polymer membrane to the second heat treatment is conducted at a temperature of greater than or equal to 525° C.

10. The carbon molecular sieve of claim 1, wherein subjecting the pyrolyzed polymer membrane to the second heat treatment is conducted at a temperature of greater than or equal to 550° C.

11. The carbon molecular sieve of claim 1, wherein the first oxygen environment comprises less than 1 ppm oxygen.

12. The carbon molecular sieve of claim 1, wherein the second oxygen environment comprises between 5 ppm oxygen and 60 ppm oxygen.

13. The carbon molecular sieve of claim 1, wherein the second oxygen environment comprises between 10 ppm oxygen and 53 ppm oxygen.

14. The carbon molecular sieve of claim 1, wherein the polymer membrane is a hollow fiber polymer membrane.

15. The carbon molecular sieve of claim 1, wherein the polymer membrane has a carbon content of at least 60 wt % and a hydrogen content of less than 5 wt. %.

16. The carbon molecular sieve of claim 1, wherein the carbon molecular sieve has an oxygen/nitrogen selectivity of greater than 7.5.

17. The carbon molecular sieve of claim 1, wherein the carbon molecular sieve has an oxygen/nitrogen selectivity of greater than 8.

18. The carbon molecular sieve of claim 1, wherein the carbon molecular sieve has an oxygen permeance of greater than 25 GPU.

19. The carbon molecular sieve of claim 1, wherein the carbon molecular sieve has an oxygen permeance of greater than 30 GPU.

20. The carbon molecular sieve of claim 1, wherein the carbon molecular sieve has an oxygen/nitrogen selectivity of greater than 7.5 and an oxygen permeance of at least 30 GPU.

21. The carbon molecular sieve of claim 1, wherein the carbon molecular sieve has an oxygen/nitrogen selectivity of at least 8.7 and an oxygen permeance of at least 13.8 GPU.

22. The carbon molecular sieve of claim 1, wherein the carbon molecular sieve has an oxygen/nitrogen selectivity of at least 8 and an oxygen permeance of at least 30 GPU.

23. The carbon molecular sieve of claim 1, wherein the carbon molecular sieve comprises a pyrolyzed hollow fiber polymer membrane.

24. The carbon molecular sieve of claim 1, wherein the polymer membrane is a hollow fiber polymer membrane with a bore or lumen passing through the length thereof.

25. A method of decreasing the content of a gas in a mixture of gases, comprising:
    contacting the mixture with the carbon molecular sieve of claim 1, and
    separating two gas streams at the carbon molecular sieve.

26. The method of claim 25, wherein the two gas streams comprise a first gas stream enriched in a first gas and a second gas stream that is depleted in the first gas.

27. The method of claim 25, wherein the carbon molecular sieve has an oxygen/nitrogen selectivity of greater than 7.5.

28. The method of claim 25, wherein the carbon molecular sieve has an oxygen/nitrogen selectivity of greater than 8.

29. The method of claim 25, wherein the carbon molecular sieve has an oxygen permeance of greater than 25 GPU.

30. The method of claim 25, wherein the gas mixture is selected from the group consisting of a mixture containing oxygen and nitrogen, a mixture containing carbon dioxide and methane, a mixture containing helium and nitrogen, and a mixture containing helium and sulfur hexafluoride.

31. The method of claim 25, wherein the gas mixture is selected from the group consisting of a mixture containing ethylene and ethane, and a mixture containing propylene and propane.

32. The method of claim 25, wherein the gas mixture comprises oxygen and nitrogen.

* * * * *